United States Patent [19]

Ailman et al.

[11] Patent Number: 4,623,971
[45] Date of Patent: Nov. 18, 1986

[54] MACHINE CONTROL WITH MOTOR VELOCITY CONSTRAINT

[75] Inventors: LaVerne K. Ailman, Lebanon; Danny E. Riggen, Middletown; Ronald L. Tarvin, Cincinnati, all of Ohio

[73] Assignee: Cincinnati Milacron Inc., Cincinnati, Ohio

[21] Appl. No.: 509,987

[22] Filed: Jun. 30, 1983

[51] Int. Cl.[4] .................. G05B 11/32; G05B 13/00; B25J 11/00
[52] U.S. Cl. .................................. 364/513; 364/171; 364/174; 318/561; 901/19; 901/23
[58] Field of Search ............ 364/150, 153, 154, 166, 364/167, 172, 174, 191, 192, 193, 513, 577; 318/561, 568, 569, 575, 592, 594, 595; 901/7, 9, 19, 23, 49

[56] References Cited

U.S. PATENT DOCUMENTS

| | | | |
|---|---|---|---|
| 3,798,430 | 3/1974 | Simon et al. | 364/174 X |
| 3,941,987 | 3/1976 | Tack, Jr. | 364/174 X |
| 4,041,287 | 8/1977 | Kolell et al. | 364/169 X |
| 4,055,787 | 10/1977 | Beadle et al. | 364/171 X |
| 4,404,505 | 9/1983 | Swanson et al. | 318/561 |
| 4,422,781 | 12/1983 | Armfield et al. | 318/561 X |
| 4,453,221 | 6/1984 | Davis et al. | 364/513 |
| 4,486,797 | 12/1984 | Workman | 318/561 |
| 4,504,771 | 3/1985 | Inaba et al. | 318/561 |

FOREIGN PATENT DOCUMENTS 2027938 4/1978 United Kingdom ............... 364/193

*Primary Examiner*—Joseph Ruggiero
*Assistant Examiner*—Jon D. Grossman
*Attorney, Agent, or Firm*—John W. Gregg

[57] ABSTRACT

A method and apparatus are provided for controlling interpolated linear motion of a tool centerpoint associated with a function element carried by a machine. The motion is defined by input signals representing locations relative to an input coordinate system and path velocities therebetween. The machine includes at least one member rotating about an axis which is subject to movement at a velocity greater than the path velocity. Control is effected by producing projected velocity signals for the machine axes for each interpolative iteration and reducing the iterative path velocity in response to detecting a projected axis velocity in excess of an associated axis velocity limit. The control is applicable to machines incorporating a structure in which members must instantaneously change position to maintain the tool centerpoint on the path.

12 Claims, 20 Drawing Figures

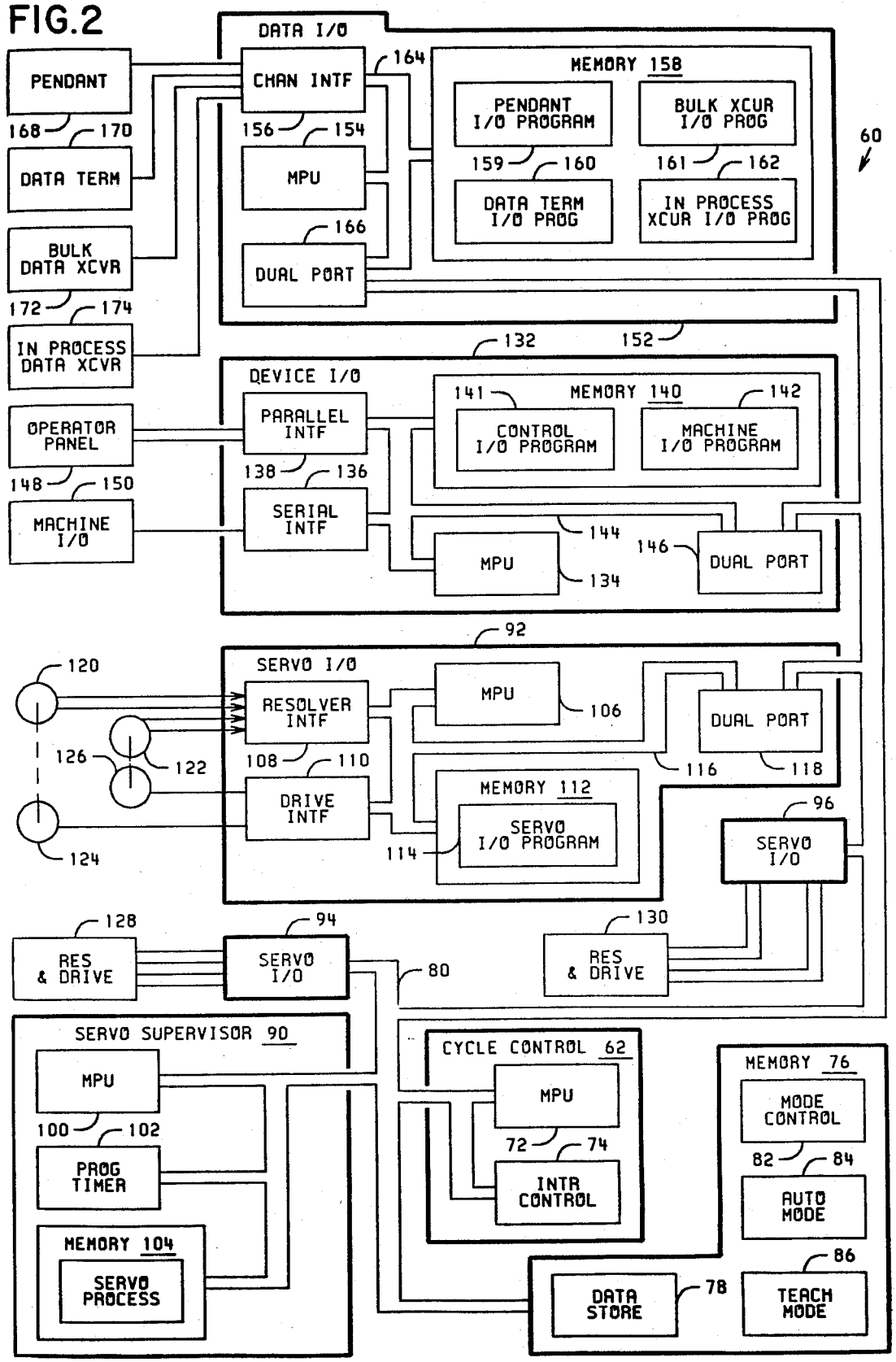

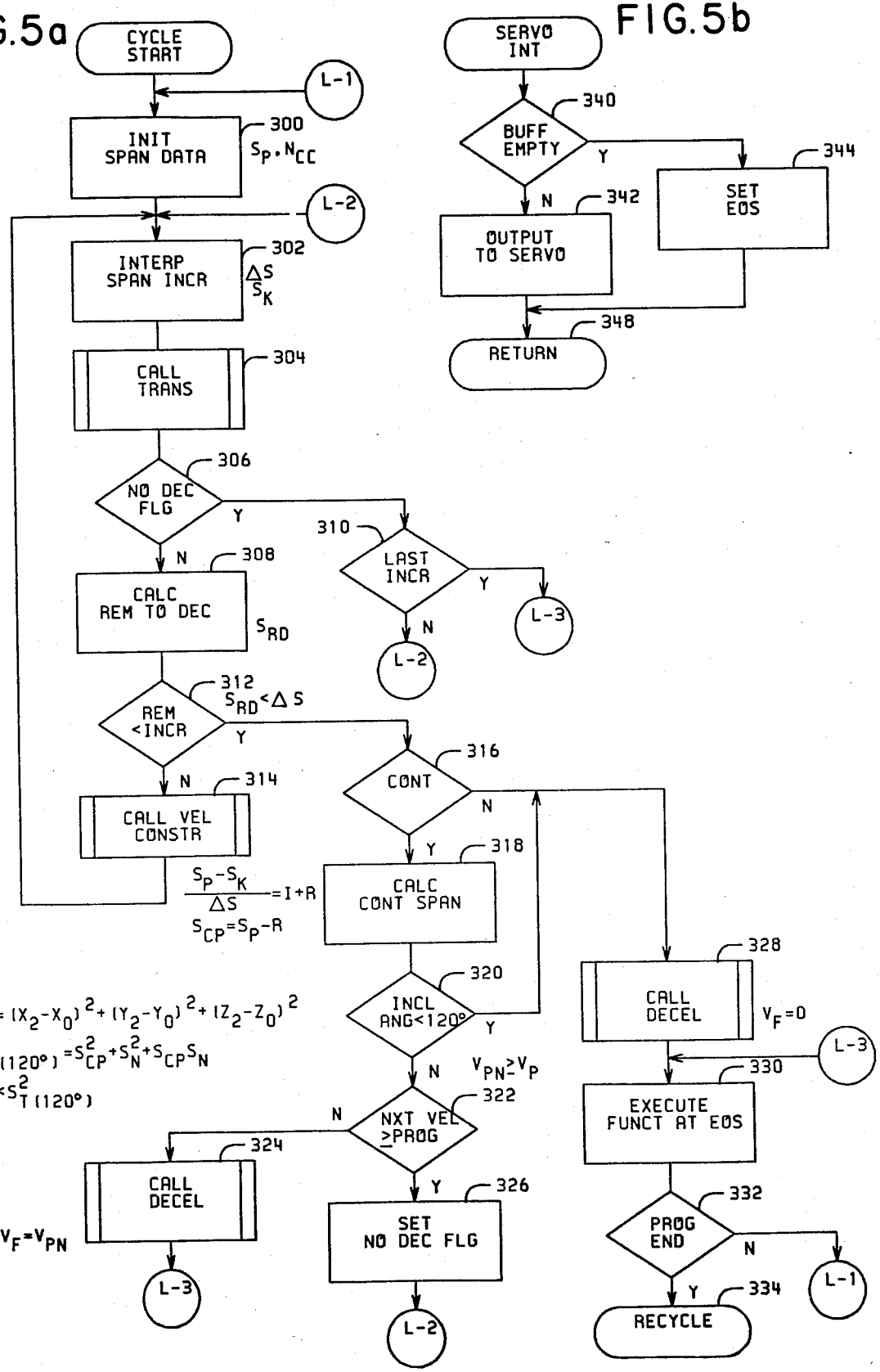

MACHINE CONTROL WITH MOTOR VELOCITY CONSTRAINT

BACKGROUND OF THE INVENTION

This invention relates generally to motion control for multiaxes industrial manipulators. In particular, this invention relates to control of path velocity to constrain the machine axes velocities to predetermined limits.

In articulated manipulators having axes of rotary motion, control of a tool centerpoint along a linear path at a programmed velocity can produce machine axes velocities in excess of acceptable limits. It is known to control the rate of motion by the maximum rate of the limiting machine axis velocity or alternatively to specify non linear motion to maximize motion velocity. In this type of control some motions may be programmed to proceed on a linear path at a programmed velocity while others are programmed to proceed off a linear path at a rate determined by the greatest permitted axis velocity, the choice being left to the programmer. This programming choice adds to the complexity of creation of the overall program defining the manipulator cycle of operation and increases the risk that actual manipulator performance will differ from that desired in automatic mode.

While most instances of excess axis velocity may be readily predicted from past performance of the axis velocities within a region of any interpolated location, some manipulator structures are such that conditions are created which instantaneously require large angular changes to achieve the next desired position and orientation along a path. For example, a manipulator wrist design as is described in U.S. Pat. No. 4,068,536, must reorient two axes by 90° in order for the tool to follow a path requiring a rotation perpendicular to the plane separating the inner and outer wrist segments. When such a condition occurs the velocity of the changing axes can reach excessive values virtually instantaneously. To prevent the drive motors for the wrist segments from being subjected to such excessive velocity demands, it is desired to predict when such conditions are likely to arise and constrain the path velocity as required to maintain the motor velocities within acceptable limits.

It is, therefore, one object of the present invention to provide a method and apparatus for control of linear motion of an industrial manipulator having axes of rotary motion to dynamically reduce path velocity to constrain machine axis velocities below their respective limits.

It is a further object of the present invention to provide a method and apparatus for control of motion of an industrial manipulator using current path velocity information to predict future machine axis velocities and to reduce the path velocity in response to detecting a future axis velocity in excess of its associated limit.

It is a further object of the present invention to provide a method and apparatus for control of motion of an industrial manipulator using current arm configuration and path velocity information to produce machine axis velocity signals representing future values of machine axis velocities and to reduce the path velocity in response to detecting a future axis velocity in excess of its limit.

Further objects and advantages of the present invention shall become apparent from the accompanying drawings and the description thereof.

SUMMARY OF THE INVENTION

In accordance with the aforesaid objects, a method and apparatus are provided for dynamically reducing path velocity of an industrial manipulator during execution of its cycle of operation to constrain the manipulator axes velocities below their respective limits. The cycle of operation is defined by input signals representing coordinates of locations measured with respect to a rectangular coordinate system and path velocities therebetween. The apparatus produces motion of a function element carried by the manipulator by interpolating a straight line using a fixed increment time interval to define intermediate locations between the programmed locations. Increment velocity signals are iteratively produced representing the path velocity for each increment interval. Intermediate location signals are produced in response to the increment velocity signals and the input signals and represent the coordinates of the end points of increments along the path. Sets of machine axis command signals are produced in response to the intermediate position signals, the sets of machine axis command signals representing increments of motion of the machine members relative to their axes of motion. Projected velocity signals are produced in response to the incremental interval period and the machine axis command signals, the projected velocity signals representing machine axis velocities of a future iteration extrapolated from the velocity changes reflected in the current iteration. The projected velocity signals are compared to limit values and if any of the axis velocity signals exceeds its associated limit, the path velocity is reduced for the next iteration.

To accommodate machine axes subject to an instantaneous velocity change arising at critical machine configurations, proximity iteration signals are produced representing the number of iterations between the current configuration and a critical configuration. The proximity iteration signals are compared to a limit and, if found to be less, used to produce the projected velocity signals for the affected machine axes.

BRIEF DESCRIPTION OF THE DRAWINGS

FIG. 2 is a block diagram of the control of FIG. 1.

FIGS. 5a and 5b are flow charts of the two principle control procedures effecting motion control.

FIGS. 6a through 6f are flow charts of subroutines and major segments of the flow chart of FIG. 5a.

DESCRIPTION OF THE PREFERRED EMBODIMENT

For purposes of illustrating the present invention, a manipulator and control shown in the accompanying drawings shall be described in detail. This manipulator and control correspond to those manufactured by Cincinnati Milacron Industries Inc., the assignee of the present invention. While the detailed description of the preferred embodiment shall necessarily reflect the actual implementation, such details should not be construed as limitations on the present invention which is defined by the appended claims.

Figure 1:
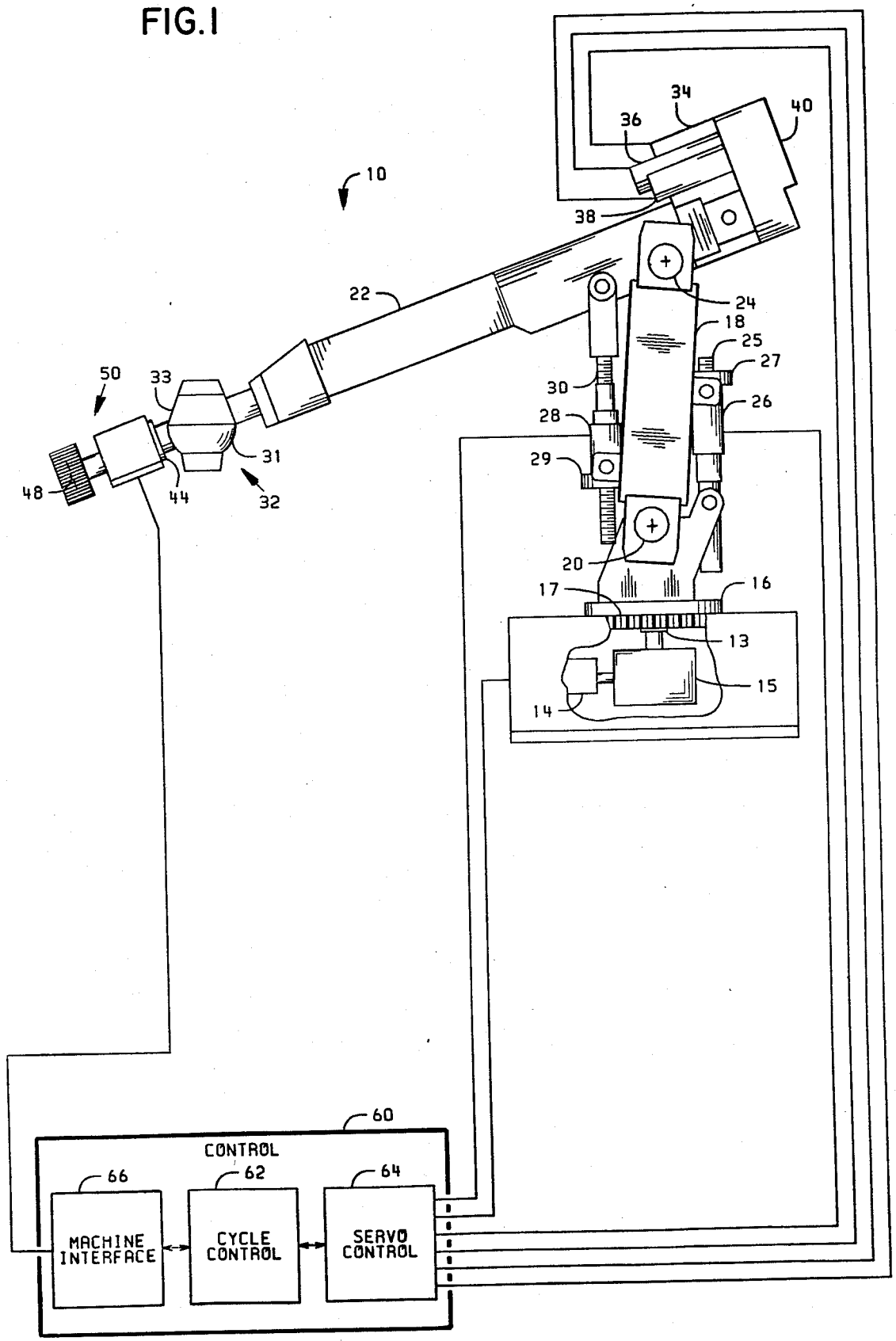
FIG. 1 shows an industrial manipulator and the schematic connection thereof to a control.

Referring to FIG. 1, a manipulator 10 is shown carrying a tool 50 and connected to a control 60. The manipulator is constructed so that the motion of its members describe axes of rotation. The first of these axes is called the base axis and is defined by rotation of the plate 16 about a vertical axis through its center. An upper arm 18 rotates about a horizontal axis, called the shoulder axis, through the center of pivot 20 intersecting the vertical axis of rotation of the base. A forearm 22 rotates about a horizontal axis called the elbow axis, through the pivot 24. Mounted at the end of forearm 22 is wrist 32 which provides three additional axes of rotation. The first of these is rotation of segment 33 about an axis lying parallel to the longitudinal center line of forearm 22; the second is rotation of segment 31 about an axis perpendicular to the slice separating the inner segment 33 from the outer segment 31; and, the third is rotation of face plate 44 about an axis orthogonal thereto and through its center.

Rotations of members about the base, shoulder, and elbow axes are sufficient to define locations within the operating volume of the manipulator of a tool center-point 48 associated with the tool 50. Rotations of the inner and outer segments of the wrist 32 and the face plate 44 control orientations of the tool at the programmed locations in accordance with programmed orientation angles. Each of the six axes of motion is servocontrolled by connection of command and feedback signals to servocontrol 64 of the control 60. Operation of the tool 50 is accomplished by a machine interface 66 which responds to the programmed cycle of operation controlled by the cycle control 62. The cycle control 62 operates upon stored location, velocity, and function data to produce control signals for the servocontrol 64 and the machine interface 66.

Rotations of the upper arm and forearm about their respective axes are achieved by the linear motions of the screws 30 and 25 through the nuts 28 and 26. Rotation of the nuts is imparted through pulleys 29 and 27 respectively by drive motors not shown. Rotation of plate 16 about its axis is accomplished through the transmission 15 driving the pinion 13 which in turn drives ring gear 17 mounted to plate 16. The drive to transmission 15 is provided by motor 14. Rotation of the axes of wrist 32 is accomplished through concentric torque tubes, not shown, within forearm 22 driven by the motors 34, 36, and 38 through transmission 40. Position signals for each moveable member are produced by position transducers, such as resolvers, which may be mechanically driven by actual motion of the member or the drive motor of the machine member.

Referring now to FIG. 2, the block diagram of the control of FIG. 1 shall be described. The control is implemented using a plurality of microprocessors communicating through a common bus. Applicants have chosen to use the commercially available 8085 and 8086 microprocessors produced by Intel Corporation. It will be recognized by those skilled in the art that any other suitable general purpose digital computer could be used to implement the control algorithms to be described hereinafter.

Cycle control 62 includes microprocessor 72 and interrupt control 74 both tied directly to the system bus 80. Operating system programs executed by microprocessor 72 are stored in memory 76 and include the programs identified as mode control 82, auto mode 84 and teach mode 86. Data defining the user specified locations, velocities and functions are stored in data store 78. Memory 76 is connected directly to system bus 80. The set of programs idenified as auto mode 84 are used by microprocessor 72 to execute the cycle of operation defined by the data stored in data store 78. Execution of the auto mode programs is carried out by microprocessor 72 independently until execution is interrupted by an interrupt signal processed by interrupt control 74. While a variety of interrupts may be necessitated by equipment associated with control 60, only a single interrupt signal produced by the servocontrol is of relevance to the present invention.

Servocontrol 64 includes the servo supervisor 90 which preprocesses servocommand signals produced by cycle control 62 and the servo input/output modules 92, 94 and 96 associated with the actual control of the manipulator axis drive motors. The servosupervisor 90 includes a microprocessor 100, a programmable timer 102, and local memory 104 including the servocontrol process programs 105. Servo interrupt signals are periodically produced by the programmable timer 102. The period between interrupt signals defines the interval of each iteration of the path control procedures executed by the cycle control. The servo-supervisor 90 receives machine axes command signals representing increments of motion of the machine members relative to their axes of rotation to be effected during the iteration interval. These machine axis command signals are processed by the servo-supervisor 90 to produce servo-command signals defining subincrements for each of the machine axes effective for subdivisions of the iteration interval. The servo-command signals are distributed to the servo input/output modules 92, 94 and 96 at predefined subintervals of the iteration interval. The servo input/output modules 92, 94 and 96 use the servo-command signals and feedback signals produced by position transducers to control the machine axes drive motors.

The block diagram of the servo input/output module 92 is representative of the interconnection of elements of the servo input/output modules 94 and 96. Data is transferred to and from the module from the system bus 80 through the dual port device 118. The module includes a local bus 116 interconnecting a microprocessor 106 with the dual port device 118, a local memory 112, the drive interface circuitry 110, and the machine axis position measuring transducer interface 108. The microprocessor 106 controls two machine axis drive motors, such as motors 124 and 126 in response to the servo-command signals and the feedback signals according to the servo input/output program 114 stored in memory 112. Each machine axis servo-command signal is compared to the corresponding current position signal as defined by the position transducer to produce a position error signal which is then applied to the drive interface circuitry 110 to produce a drive control signal for application to the associated machine axis drive motor.

Keeping in mind that each servo I/O module controls two machine drive axes, the blocks 128 and 130 are understood to each represent two pairs of resolvers and drive motors. Servo-command signals represent increments of machine axis motion to be effected within a few milliseconds. By contrast the machine axis command signals represent increments of machine member motion to be effected within the iteration interval of 10 to 20 milliseconds.

In addition to the generation of the machine axis command signals, cycle control 62 controls the execution of functions associated with the tool 50 to be performed at programmed locations. Function commands are stored with the program data in data store 78 and are executed in accordance with function execution sub-routines associated with the auto mode programs 84. Control of machine functions is effected through input/output devices, such as limit switches, push buttons, relays and solenoids. The machine input/output devices are directly controlled by the device I.O. module 132 in cooperation with the machine input/output interface circuitry 150. Data is transferred to and from the system bus 80 through the dual port device 146. The dual port device 146 is connected to the local bus 144 of the device input/output control module 132. Operation of the module is controlled by the local microprocessor 134 connected to bus 144 which executes programs stored in the local memory 140.

Connection of the machine input/output interface circuitry 150 to module 132 is accomplished through a serial interface circuit 136. A control cabinet operator panel 148 is connected by parallel lines to a parallel interface circuit 138. Monitoring and control of the interface circuits 138 and 136 are accomplished by the microprocessor 134 in response to respectively the control I.O. program 141 and the machine I.O. program 142 stored in local memory 140. Current conditions of machine input/output devices are reflected in device status signals transferred from the device I.O. module through the dual port device 146 to the cycle control 62. Function command signals produced by cycle control 62 in accordance with the stored program of operation are transferred over system bus 80 through dual port device 146 and ultimately to the appropriate machine input/output interface device by the serial interface 136.

In addition to signal exchange between machine device interfaces, the control permits exchange of data through the data input/output module 152 and its associated interfaces. While the cycle control 62 is operating under the auto mode programs 84, location data may be exchanged in response to function commands. This in-process data exchange takes place between an in-process data transceiver 174 and the control 60 through the data I.O. module 152. Location data from data store 78 is transferred from system bus 80 to the data I.O. module through its dual port device 166. The data I.O. module microprocessor 154 operating under control of the in-process transceiver I.O. program 162 stored in its local memory 158 transfers the location data from dual port device 166 to the serial channel interface 156 for transmission to the in-process data transceiver 174. In reverse, data from the in-process data transceiver 174 is input to the serial channel interface 156 and transferred therefrom on the local bus 164 to the dual port device 166. From there data is available to the cycle control 62 on the system bus 80.

In addition to the in-process data exchange just described, program data may be exchanged between the data store 78 of memory 76 and a bulk data store through a bulk data transceiver 172 or to a data terminal 170. Examples of a bulk data store include serial tape and data disk devices. A data terminal 170 may be used to display and modify program data for restorage after modification. In either event data is exchanged by the data I/O module microprocessor 154 operating in response to the appropriate program set such as, for example, the data terminal I/O program 160 or the bulk data transceiver I/O program 161. Data is transferred to and from the external device through the serial data interface 156 to the local bus 164 and through the dual port device 166 connected to system bus 80.

One final data input/output device, the teach pendent 168 is associated with the execution of teach mode programs 86 by the cycle control 62. Location and function data defining a programmed cycle of operation may be generated by an operator using the teach pendent 168. This pendent permits manual operation of manipulator 10 and the storage of location and function data in data store 78. As with the other data input/output devices, data is transferred to and from pendent 168 through the serial channel interface 156 to local bus 164 and therefrom through the dual port device 166 to the system bus 80. As the teach mode of operation does not form a part of the present invention further details thereof shall not be given herein. Additional details of the operation of the robot in the teach mode may be found in U.S. Pat. No. 3,920,972.

As it is the object of the auto mode programs 84 to control the motion of the machine members to produce motion of the tool centerpoint along a straight line path between programmed locations, a schematic representation of the manipulator shall be useful in describing the auto mode control algorithms. Such a schematic representation is depicted in FIG. 3a. In FIG. 3a a series of line segments corresponding to the arm members of manipulator 10 are shown in relation to a rectangular coordinate system. The origin of this coordinate system corresponds to a point on the manipulator located at the intersection of the vertical axis of rotation of the base plate 16 and the horizontal axis of rotation through pivot 20. In this drawing, link 19 corresponds to upper arm 18, link 23 corresponds to forearm 22, link 45 corresponds to the span from the point of intersection of the three axes of rotation of wrist 32 to a point on the final axis of rotation (roll axis) the tool length distance from the face plate 44, link 47 corresponds to a first tool offset along the Y axis of a hand coordinate system and link 49 corresponds to a second tool offset along the Z axis of the hand coordinate system. Additional description of the hand coordinate system shall be provided subsequently.

The links of FIG. 3a are dimensioned respectively with lengths $L_1$, $L_2$, $L_3$, $L_4$ and $L_5$. The three axes of rotation of the base plate, upper arm, and forearm members are dimensioned by magnitudes of the angles A, B and C shown in FIG. 3a. It will be appreciated by those skilled in the art with reference to FIG. 3a that the lengths $L_1$ through $L_5$ and the magnitudes of the angles A, B, and C completely define the location of the tool centerpoint 48 provided that the three axes of rotation of wrist 32 are so arranged that link 45 is along the axis of link 23. The introduction of rotation at the axes of wrist 32 provides for orientation of a function element associated with tool 50 through the tool centerpoint 48.

Consequently, each set of data for a location includes the rectangular coordinate values of the location of tool centerpoint 48 and the values of three orientation angles defining the orientation of the function element. The relationship of these orientation angles (Euler angles) to the wrist 32 shall be described with reference to FIGS. 3b and 3c.

Figure 3C:
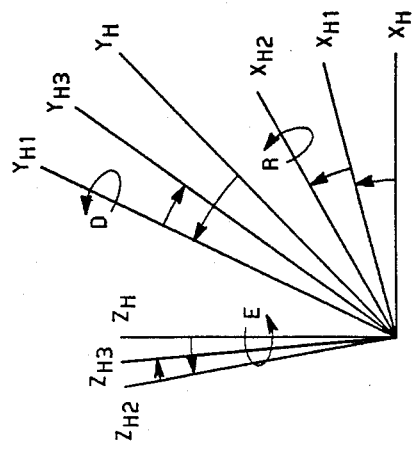
FIGS. 3b and 3c show the axes of motion of the manipulator wrist and the associated orientation angles defined by input signals.
Figure 3A:
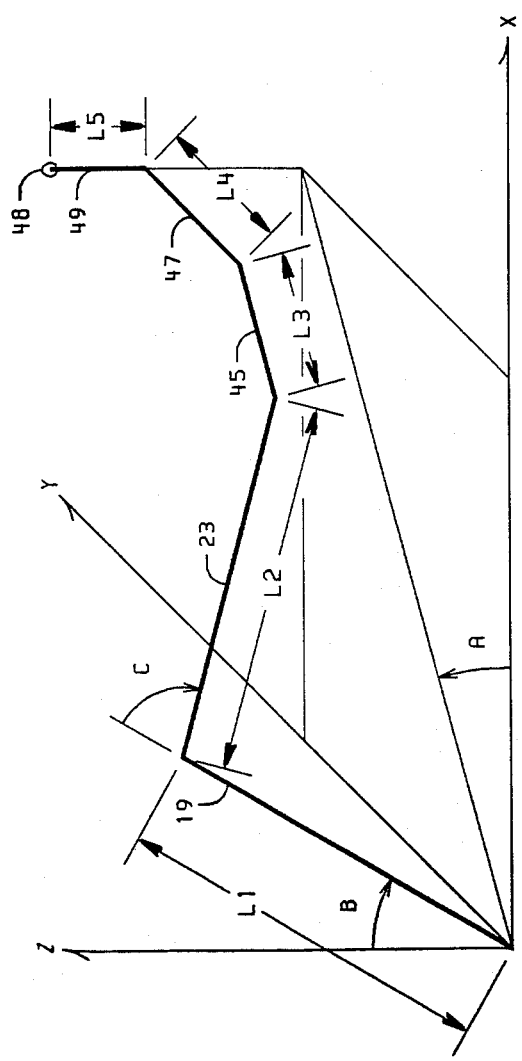
FIG. 3a is a schematic representation of the manipulator shown in the rectangular coordinate system defining coordinates of the programmed locations.
Figure 3B:
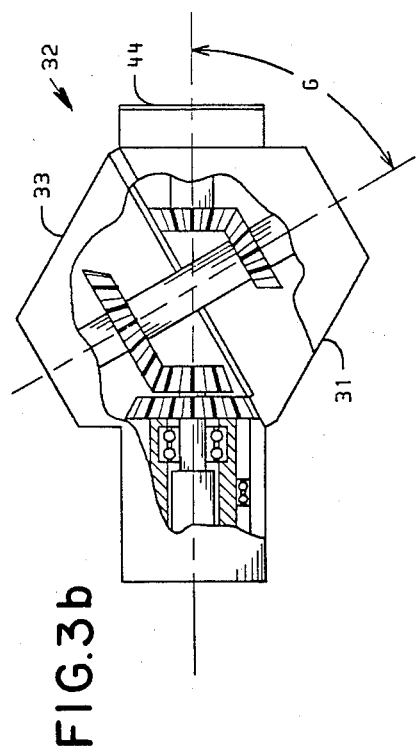

In FIG. 3b wrist 32 is shown to consist of an inner segment 33 by which the wrist is attached to manipulator 10 and an outer segment 31 upon which face plate 44 is carried. The first axis of rotation of wrist 32 is a rotation of segment 33 about the longitudinal axis corresponding to link 23 of FIG. 3a. The second axis of rotation of wrist 32 is rotation of outer segment 31 about an axis perpendicular to and through the center of the slice separating the inner segment 33 from the outer segment 31. The third axis of rotation of wrist 32 is rotation of the face plate 44 about the axis perpendicular to the plane of the face plate and through the center thereof. Tool 50 is mounted to face plate 44.

FIG. 3c illustrates how the orientation angles are defined with respect to a second rectangular coordinate system having its origin at the tool centerpoint 48. The axes of this coordinate system $(X_H, Y_H, Z_H)$ are parallel to the axes of the rectangular coordinate system defining locations of the tool centerpoint. The Angles D, E and R define rotations relative to the hand coordinate system as follows:

(1) E is the magnitude of a rotation about $Z_H$ to align $X_H$ and $Y_H$ with $X_{H1}$ and $Y_{H1}$ respectively;

(2) D is the magnitude of a rotation about $Y_{H1}$ to align $X_{H1}$ with $X_{H2}$ and $Z_H$ with $Z_{H2}$ and (3) R is the magnitude of a rotation about $X_{H2}$ to align $Y_{H1}$ with $Y_{H3}$ and $Z_{H2}$ with $Z_{H3}$.

It will now be appreciated that the arm configuration is completely defined by the X, Y and Z coordinates of the tool centerpoint 48 and the orientation angles D, E, and R when the tool length and tool offset dimensions are known.

It is the object of control of the auto mode programs 84 that motion between programmed locations of the tool centerpoint 48 be along a straight line path and that changes of orientation between programmed locations be accomplished by linearization of the orientation angle changes between the programmed locations. Motions may be executed which involve changes only of position or orientation as well as changes of both. In either event the control automatically determines the appropriate machine axis values to accomplish the change of position and/or orientation at the programmed rate, while maintaining the tool center point on the straight line path between programmed locations or at the programmed location of pure orientation moves.

Figure 4A:
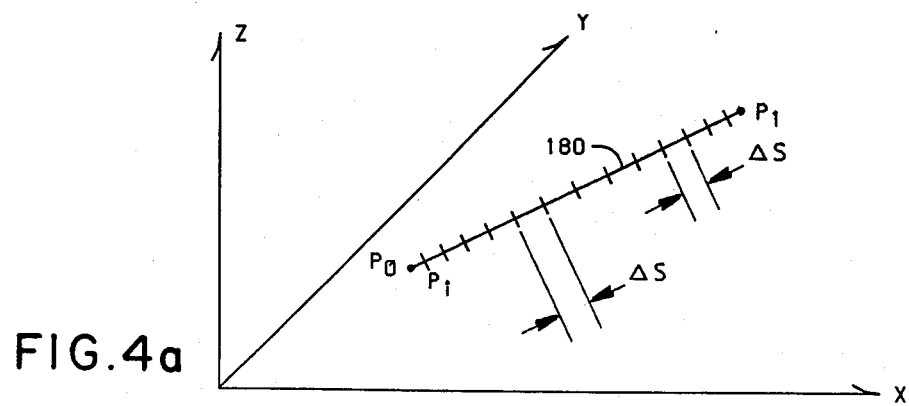
FIGS. 4a through 4c depict the motion effected by the control manipulator in an automatic mode of operation.

The motion control effected by the path control algorithm is illustrated in FIG. 4a. In this figure program locations are designated as $P_0$ and $P_1$ and the straight line path connecting them by line segment 180. In automatic mode the control iteratively interpolates intermediate locations $P_i$ between the programmed locations $P_0$ and $P_1$. This interpolation is accomplished at the fixed iteration interval defined by the recurrence of the servo interrupt signals. As the tool centerpoint proceeds along path 180 between the programmed locations it may undergo acceleration and deceleration as reflected in the changing dimension of the iteration increments designated as $\Delta S$. The length $\Delta S$ of each iteration increment is defined as the product of the iteration interval period $\Delta t$ and the incremental velocity represented by an incremental velocity signal $V_k$. The incremental velocity is varied as a function of acceleration and deceleration and may be varied in response to unprogrammed changes of other parameters. The present invention provides for variation of the incremental velocity dynamically in response to projecting the occurence of a machine axis drive velocity in excess of its associated limit.

Figure 4B:
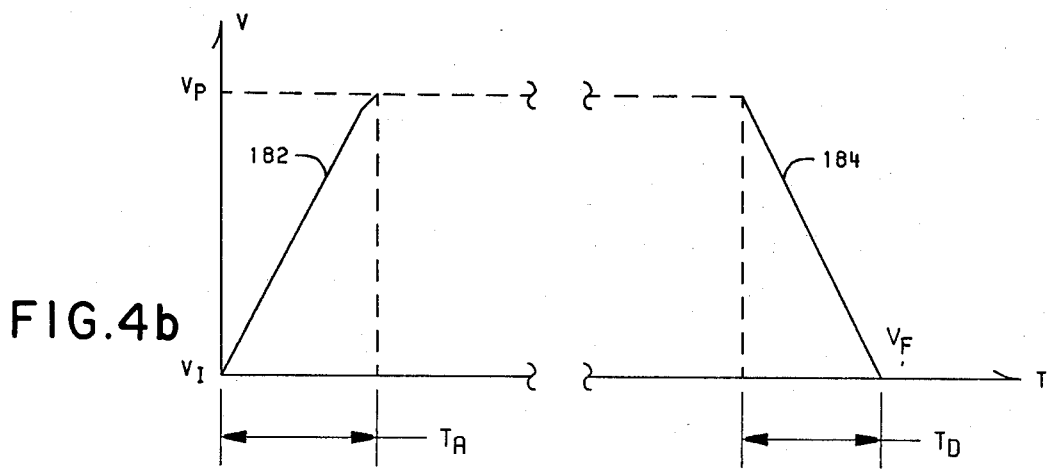

FIG. 4b illustrates the velocity profile for a move between programmed locations starting at an initial velocity $V_i$ accelerating to the programmed velocity $V_p$ and decelerating to a final velocity $V_f$. The graph segments 182 and 184 correspond to the change of velocity with time in accordance with the constant acceleration function chosen by applicants. The respective periods of acceleration and deceleration are designated as $T_a$ and $T_d$.

Figure 4C:
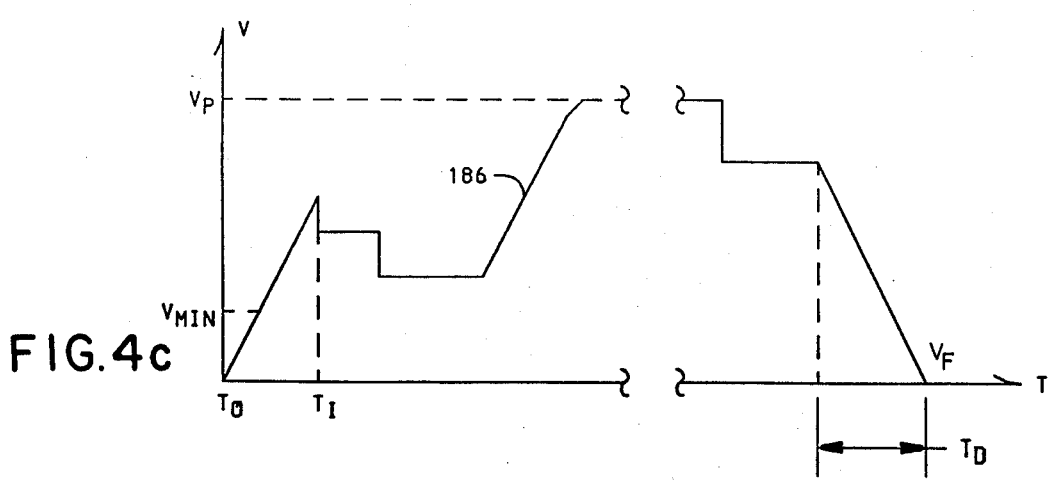

FIG. 4c shows the effects of velocity variations in accordance with constraints imposed by the projection of excess axis velocities in accordance with the present invention. During an initial period the velocity is permitted to accelerate to a minimum value and there after continues to accelerate until the first occurence of constraint is encountered at the time $T_1$. Following a period of constraint, acceleration is permitted to continue to the programmed velocity $V_p$. Subsequently, during execution of the move at the programmed velocity a further occurence of velocity constraint is encountered followed by a deceleration period designated by the time span $T_d$.

As was previously stated, the path control algorithm of the present invention involves execution of the auto mode programs 84. The auto mode is concerned with two principle procedures, first to produce the axis command signals for each iteration and second to process the axis command signals for application to the axis drives. FIG. 5a is a flow chart of the overall procedure for producing the axis command signals. FIG. 5b is a flow chart of the procedure for processing the axis command signals and applying the resultant servocommand signals to the axis drives.

Referring to FIG. 5a at process step 300 span data variables used in the interpolation process are initialized. These include the programmed span length $S_p$ and the coordinate component ratios Ncc. Following the initialization of the span data variables process step 302 interpolates the span increment to produce the incremental span length signal $\Delta S$ and an accumulated span length signal $S_k$. At process step 304 the span increment is transformed from the rectangular coordinates and orientation angle input data to machine coordinate data defining the magnitudes of the increments of rotation about the machine axes. The subroutine associated with process step 304 produces the axis command signals and stores these signals in a buffer for access by the servosupervisor 90 on the occurence of the servo interrupt signal. Following the execution of the subroutine of process step 304 a test is made at decision step 306 to determine whether or not a flag indicating that no deceleration is required has been set. If the no deceleration flag has been set the process continues at decision step 310 where it is determined whether or not the present increment being interpolated is the last increment of the current linear span between programmed locations. If the current increment is the last increment of the span the process continues through the connector $L_3$ to process step 330 where the function associated with the end of span is executed. Thereafter, decision step 332 determines whether or not the present location is the last location of the program. If not, further programmed location data will be processed by proceeding through the connector $L_1$. If it is the last, the entire programmed cycle of operation will be reexecuted through the recycle of terminal 334.

Returning to decision step 306, had it been determined that the no deceleration flag was not set then the execution of the procedure continues at process step 308 where the distance remaining to the beginning of the deceleration subspan is calculated. This calculation produces the remaining distance signal $S_{rd}$. Thereafter at decision step 312 the magnitude of the remaining distance $S_{rd}$ is tested against the current incremental distance $\Delta S$ to determine whether or not the remaining distance $S_{rd}$ is less than the current incremental distance $\Delta S$. If the remaining distance is not less than the current incremental distance the process continues at step 314 where execution of the velocity constraint subroutine is initiated by a subroutine call. The velocity constraint subroutine produces projected velocity signals based on the axis velocity changes reflected in the current increment and tests the projected velocity changes for each axes drive against an associated limit to determine whether or not the path velocity for the next increment should be reduced.

Referring to decision step 312, had it been determined that the distance remaining $S_{rd}$ was less than the incremental distance $\Delta S$, then execution of the procedure would continue at decision step 316 which determines whether or not motion is to continue through the programmed location defining the end of the current linear span. If the tool centerpoint is to come to rest at the end of the current span then decision step 316 will determine that the programmed location is not a continue point and the execution of the procedure will continue at process step 328 where execution of the deceleration subroutine is initiated by the call setting the final velocity parameter signal Vf equal to zero. Upon completion of the execution of the deceleration subroutine, execution of the overall procedure continues at process step 330 where the function command associated with the end of the current span will be executed. Thereafter at decision step 332 it is determined whether the present programmed location is the last programmed location of the program. If it is, program execution is resumed by beginning at the first location of the stored program through the terminal 334 indicating that the program should be recycled. If the present location is not the last location of the stored program, execution proceeds through the connector $L_1$ to interpolate the next programmed linear span.

Referring again to decision step 316, if it had been determined that the programme d location for the end of the current span is one through which motion of the tool centerpoint is to continue, execution of the overall cycle control procedure advances to process step 318 where the distance to a continue point end of span is calculated. The continue point end of span distance is found by first calculating the integral number of iterations I equal to the present incremental distance $\Delta S$ remaining in the current span length. Second, a new end point $S_{cp}$ is calculated for the current span, $S_{cp}$ being the difference between the programmed span length $S_p$ and the remainder R in excess of an integral number of current incremental distances $\Delta S$. Thereafter, at decision step 320 it is determined whether the angle included between the current linear span and the next linear span is less than 120°. If the included angle is less than 120° the motion of the tool centerpoint will be terminated at the final location $P_1$ of the current span.

The determination of the value of the included angle relies upon the rule of cosines. Two values for the span distance between the programmed location at the beginning of the present span and the programmed location at the completion of the next span are produced independently. That is, the span length $S_t^2$ is computed as the sum of the squares of the coordinate components while the value $S_t^2$ (120°) is computed as the sum of the squares of the span length $S_{cp}$ computed in process step 318, the span length $S_n$ of the next span and the product of the next span length $S_n$ and the span length of the present span $S_{cp}$. If $S_t^2$ is less than $S_t^2$ (120°) then the included angle is less than 120°.

If it is determined at decision step 320 that the included angle is not less than 120° then execution of the overall procedure continues at decision step 322 where the programmed velocity of the next span $V_{pn}$ is tested against the programmed velocity of the current span $V_p$ to determine which is greater. If the programmed velocity of the next span $V_{pn}$ is greater than or equal to the programmed velocity of the current span $V_p$ then the procedure continues at 326 where the no deceleration flag is set and thereafter through connector $L_2$ to process step 302. If it had been determined at decision step 322 that the velocity of the next span $V_{pn}$ is less than the current programmed velocity $V_p$ then deceleration in the current span would be required and the procedure would continue at process step 324 where the execution of the deceleration subroutine is initiated by a subroutine call setting the final velocity parameter $V_f$ equal to the velocity of the next programmed span $V_{pn}$. Upon completeion of execution of the deceleration subroutine, execution of the overall process continues through connector $L_3$ at process step 330 where the function associated with the end of span is executed. Thereafter at decision step 332 it is determined whether the present location is the last programmed location of the program. If it is then the execution of the entire stored program is repeated through the recycle terminal 334. If the present location is not the last location of the program then execution of the overall process continues through the connector $L_1$ with the aquisition of the data associated with the next programmed location. It will now be apparent that the overall cycle control comprises the repeated execution of the stored programm and involves the iterative production of incremental distance signals along the straight line path between programmed locations and the execution of programmed functions associated with the programmed locations.

Referring to FIG. 5b the servo interupt service routine executed by servocontrol 90 begins at decision step 340 where it is determined whether or not the buffer in which axis command signals are temporarily stored is empty. If the buffer is empty it is assumed that the cycle control has reached the end of span and an end of span signal is set at process step 344. If the buffer is found not to be empty by decision step 340 then the axis motion increments represented by the axis command signals are retrieved from the buffer at step 342. At terminal 348 the servo interupt routine is ended and execution of the overall cycle of operation by the cycle control 62 resumes. As was previously stated the servosupervisor 90 divides the increments represented by the axis command signals into subincrements and distributes the subincrements to the servo I.O. modules. The process of division and distribution of the servo command signals continues concurrently with the execution of the overall automatic mode procedure by the cycle control 70.

The description of major segments and subroutines associated with the flow chart of FIG. 5a shall be described with reference to FIGS. 6a through 6f.

Figure 6A:
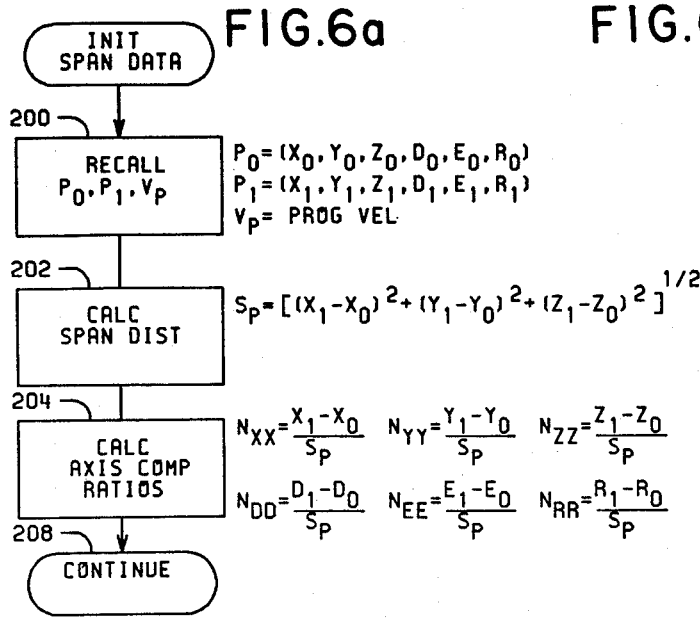

FIG. 6a is an expansion of the steps associated with process block 300 of FIG. 5a. The span data initialization procedure begins at process step 200 where data are recalled from the data store 78. The recalled data includes the coordinate data for the present and next programmed locations given as $P_0$ and $P_1$ and defined by values for the X, Y, and Z, coordinates and the D, E, and R orientation angles. In addition the programmed velocity $V_p$ is recalled from memory. At process step 202 the span length of the linear span between the present and next programmed locations is computed as the square root of the sum of the squares of the coordinate components of the linear path. At process step 204 coordinate component ratio signals $N_{XX}$ through $N_{RR}$ are computed as the quotient of coordinate components to the programmed span length. The coordinate component ratios are used by the transformation procedure to produce the coordinate components of each increment of distance along the linear path. These ratios define the linearization of the orientation angles. Following the calculation of the coordinate component ratios, execution of the overall control procedure continues as indicated by the terminal 208.

Figure 6B:
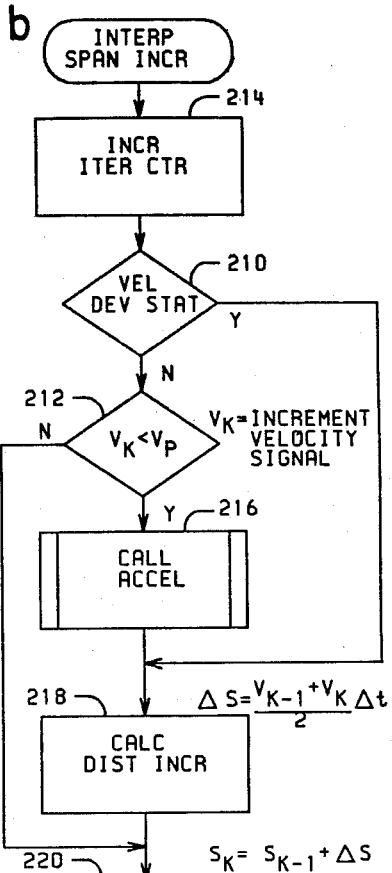

Referring again to FIG. 5a it is seen that following initialization of the span data, the control procedure continues with interpolation of a span increment as indicated by process block 302. FIG. 6b is an expansion of the process steps associated with process step 302. Referring to FIG. 6b at process step 214 the interpolatiIon iteration counter is incremented. At decision step 210 the velocity deviation status flag is tested to determine whether or not velocity variations are subject to control by the velocity constraint programs. If the velocity deviation status flag is set the execution of this process continues at process step 218 where the distance increment $\Delta S$ is computed as the product of the iteration interval period $\Delta t$ and the average of the previous incremental velocity $V_{k-1}$ and the current incremental velocity $V_k$. Thereafter at process step 220 the accumulated distance along the path is calculated as the sum of the previous accumulated distance $S_{k-1}$ and the incremental distance $\Delta S$. Overall cycle control program execution continues through terminal 221.

If it had been determined at decision step 210 that the velocity deviation status flag were not set then execution would continue at decision step 212 where it is determined whether the current incremental velocity represented by the incremental velocity signal $V_k$ is less than the programmed velocity $V_p$. If the increment velocity $V_k$ is less than the programmed velocity $V_p$ then process execution continues at process step 216 which initiates execution of the acceleration subroutine by a subroutine call. Upon completion of execution of the acceleration subroutine the process execution would continue at step 218 to produce the incremental distance signal $\Delta S$ using the incremental velocity value produced by execution of the acceleration subroutine. If at decision step 212 it is determined that the increment velocity is not less than the programmed velocity then process execution continues at process step 220 where the accumulated distance is computed using the previously calculated value of the incremental distance $\Delta S$. As before upon completion of the calculation associated with process step 220 execution of the overall control procedure is resumed through the continue of terminal 221.

Figure 6C:
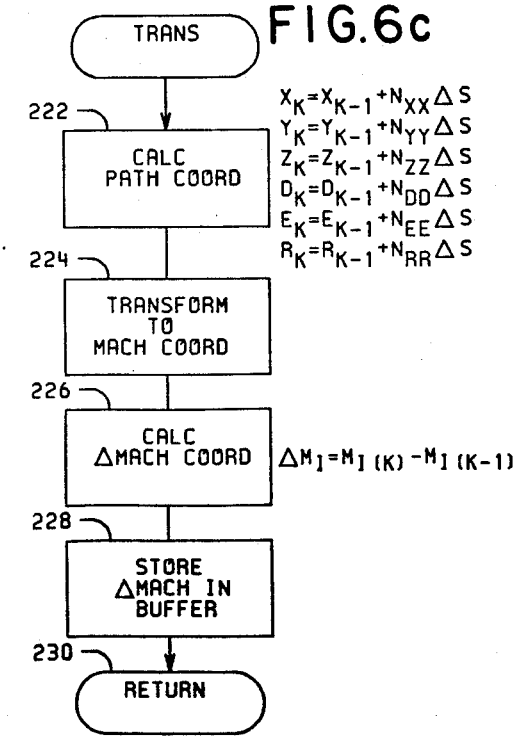
Figure 6D:
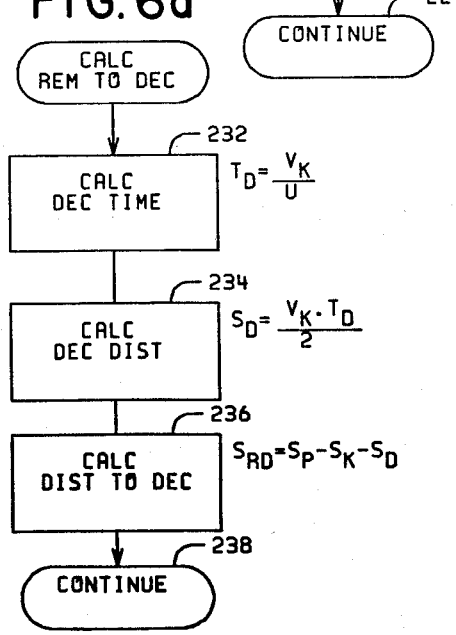

Upon completion of the execution of the process steps associated with process block 302 of FIG. 5a execution of the overall control procedure continues with the initiation of execution of the transformation procedure as reflected by the subroutine call at process step 304 at FIG. 5a. FIG. 6c is a flow chart of the transformation subroutine called by process step 304 of FIG. 5a. At process step 222 of FIG. 6c values for the reotangular coordinates and the orientation angles are computed for the current iterative increment of motion along the path. Each coordinate value equals the sum of the corresponding value calculated for the immediately preceding iteration and the product of a coordinate component ratio and the incremental distance $\Delta S$. Following the calculation at process step 224 the set of coordinate values are transformed to values of the machine coordinate system, that is, values for the axes of motion of the movable machine members. Because the machine axes are axes of rotation the transformation process requires solution of inverse trigonometric relationships. Details of the transformation process shall be described subsequently herein. Upon completion of the transformation to machine coordinates the incremental change of machine coordinates is computed at process step 226. At process step 228 the incremental change of machine coordinates represented by machine axis command signals are stored in a temporary buffer. Thereafter, execution of the overall control procedure is resumed by a return through terminal 230.

Referring again to FIG. 5a, following the execution of the transformation subroutine at process step 304 the distance remaining to the beginning of a deceleration subspan is calculated by the process associated with process block 308. The steps of this process are illustrated in the flow chart of FIG. 6d. At process step 232 of FIG. 6d the time necessary to decelerate from the current velocity to zero velocity is calculated by dividing the current incremental velocity represented by the increment velocity signal $V_k$ by the constant of acceleration U. At process step 234 the distance required to decelerate from the current incremental velocity to zero is calculated using the time value calculated at process step 232. The deceleration distance $S_d$ is equal to one-half the product of the incremental velocity and the deceleration time $T_d$. At process step 236 the distance between the intermediate location produced by the current iteration and the beginning of the deceleration span is calculated by subtracting the accumulated distance $S_k$ and the deceleration distance $S_d$ from the programmed span length $S_p$. The resultant remaining distance $S_{rd}$ to the beginning of deceleration is used by the overall control procedure when execution thereof is resumed through the continue of terminal 238 to bring control procedure execution to decision step 312.

With reference to FIGS. 5a and 6b it is apparent that the deceleration subroutine differs in function from the acceleration subroutine in that it is used to achieve interpolation to the final velocity for the current span. The acceleration subroutine is used only to modify the increment velocity within the interpolation process.

Figure 6E:
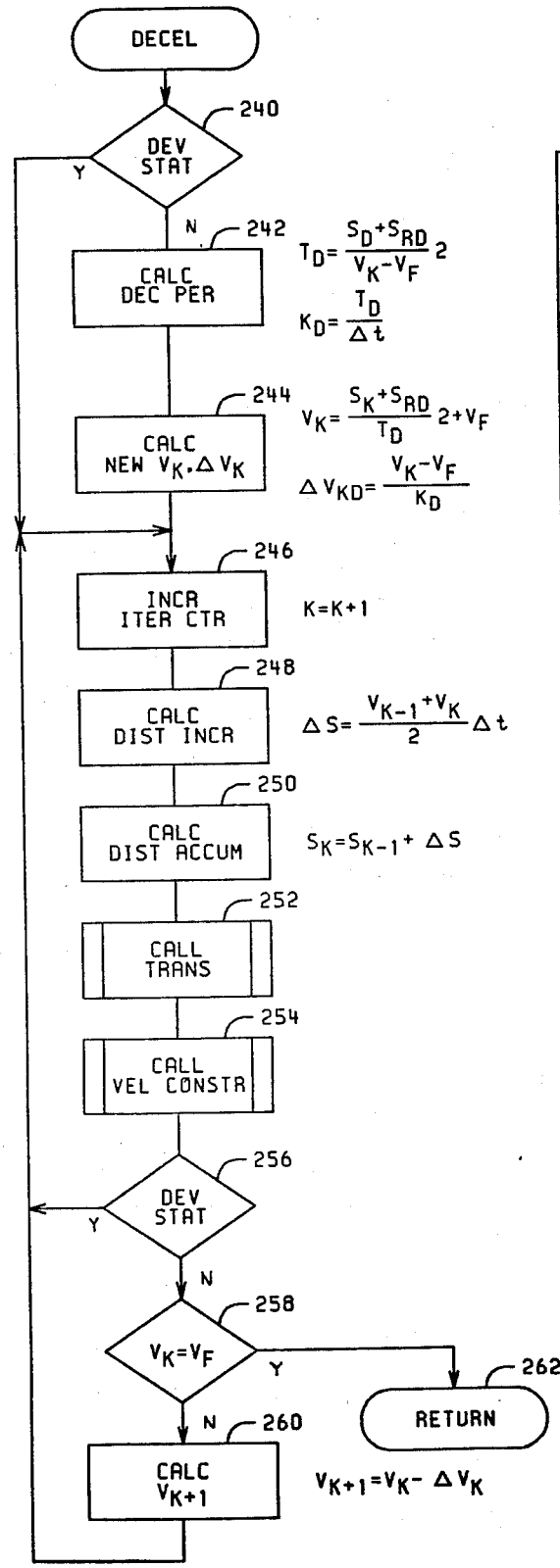
Figure 6F:
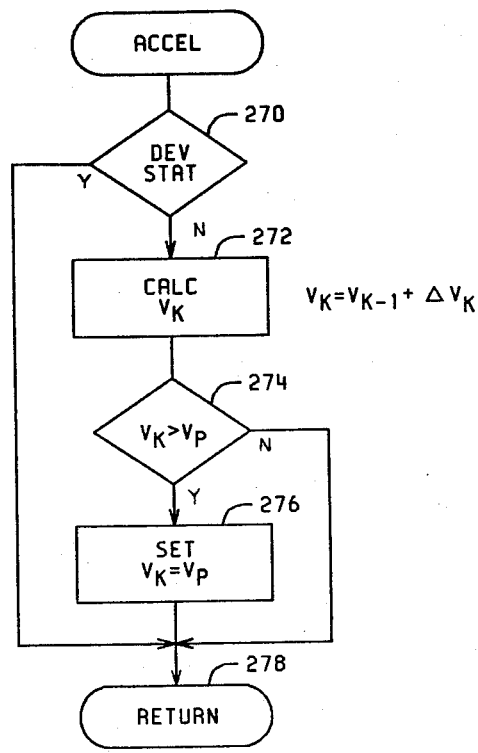

FIG. 6e is a flow chart of the deceleration subroutine. At decision step 240 it is determined whether or not the deviation status flag has been set indicating that velocity constraint is effective. If not, execution continues through process steps 242 and 244 to produce a new value of incremental velocity effective for the first iteration of deceleration. If the velocity deviation status flag is set, process steps 242 and 244 are skipped. In either event, at process step 246 the iteration counter is incremented. At process step 248 a value for the incremental distance ΔS is computed for the current iteration. At process step 250 the accumulated span distance $S_k$ is calculated using the incremental span distance ΔS just computed. At process step 252 execution of the transformation subroutine is initiated by a subroutine call.

Upon completion of execution of the transformation subroutine, execution of the deceleration subroutine is resumed at process step 254 where execution of the velocity constraint subroutine is initiated by a subroutine call. Upon completion of execution the velocity constraint subroutine, execution of the deceleration subroutine resumes at decision step 256 where the velocity deviation status flag is tested. If the velocity deviation status flag is set the next iteration will be executed using the velocity value produced by the velocity constraint subroutine and execution of the deceleration subroutine is carried on from process step 246. If, on the other hand, the velocity deviation status flag has not been set, then execution proceeds to decision step 258 where it is determined whether or not the incremental velocity equals the final velocity previously established for the deceleration subroutine. If not, a new incremental velocity is calculated at process step 260 using the velocity of the current iteration and a velocity differential computed according to the deceleration period and the velocity difference computed when the deceleration subroutine execution was initiated. Thereafter, execution of the deceleration subroutine continues at process step 246. Process steps 246 through 260 are repeated until the deceleration subroutine produces the desired final velocity $V_F$. Thereafter, execution of the overall control procedure is resumed by the return through terminal 262.

Unlike the deceleration subroutine, the acceleration subroutine is an integral part of the interpolation process illustrated in the flow chart of FIG. 6b. The acceleration subroutine is illustrated by the flow chart in FIG. 6f. At decision step 270 it is determined whether or not the velocity deviation status flag has been set by the velocity constraint subroutine. If the velocity constraint subroutine has determined that velocity constraint is required, further acceleration is inhibited. Thereafter, the execution of the overall control procedure is resumed by the return through terminal 278.

If at decision step 270 it had been determined that the velocity deviation flag had not been set, execution of the acceleration subroutine would continue at process step 272 where a new incremental velocity value $V_k$ would be computed by adding the previous value of the incremental velocity $V_{k-1}$ to the incremental velocity variation $\Delta V_k$. At decision step 274 the new velocity value $V_k$ is compared to the programmed velocity $V_p$. If found greater, then at process step 276 the incremental velocity value $V_k$ is set equal to the programmed velocity $V_p$. Thereafter, execution of the overall control procedure is resumed by the return through terminal 278. If the incremental velocity does not exceed the programmed velocity, step 276 is skipped.

It will now be appreciated that the function of the acceleration subroutine is to produce an incrementally increasing value for the incremental velocity $V_k$. In the event that the velocity constraint subroutine determines that the path velocity must be reduced, acceleration is inhibited until the constraint condition has been relieved. Thereafter, acceleration will be resumed as a result of the comparison between the incremental velocity $V_k$ and the programmed velocity $V_p$. Acceleration will occur between the then current incremental velocity and the programmed velocity $V_p$.

As was previously stated, it is necessary to transform the coordinates of each increment from the rectangular coordinates and orientation angles of the input coordinate system to the machine coordinates to produce the machine axis command signals. Because the machine members move about axes of rotation this transformation necessarily involves inverse trigonometric relationships. However, applicants have chosen to solve the relationship between the rectangular coordinates and the machine coordinates using the Newton-Raphson process of iterative approximation. This choice of a solution method is not to be regarded as a limitation of the present invention. Nevertheless, this solution technique produces satisfactory results using the limited computational capability of the control design adopted by applicants.

The coordinate transformation subroutine shall be described with reference to FIGS. 7a, 7b and 7c. In addition reference may be had to the schematic drawings of FIGS. 3a and 3c to relate the machine coordinate values and program coordinate values. The overall transformation process will proceed by first solving for the joint angles A, B, and C. Thereafter, expressions relating the orientation angles D, E, and R and the joint angles A, B, and C to the wrist rotation angles W1, W2, and W3 can be solved for the wrist rotation angles. To solve for the joint angles A, B, and C, it is first necessary to solve for the coordinates of the wrist centerpoint. The wrist centerpoint coordinates are readily determined from the known data including orientation angles D, E, and R, the tool length $L_3$, the tool offsets $L_4$ and $L_5$ and the rectangular coordinates of the tool centerpoint $X_k$, $Y_k$, and $Z_k$.

Figure 7A:
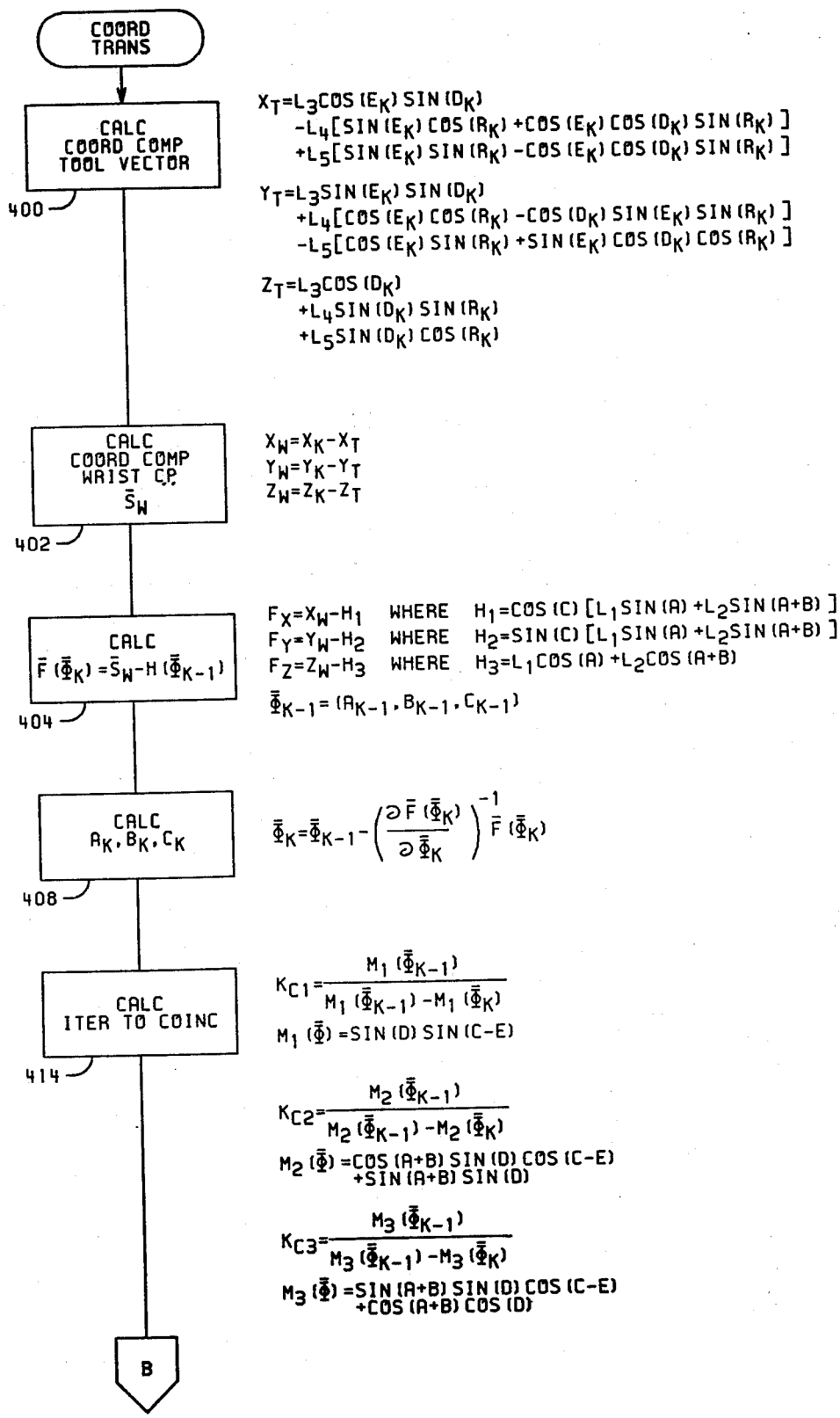
FIGS. 7a through 7c are flow charts of the transformation procedure of the flow chart of FIG. 6c.

Thus, at process step 400 of FIG. 7a the coordinate components of a tool vector from the wrist centerpoint to the tool centerpoint are computed using the known values for the orientation angles D, E, and R, and the tool length and tool offsets. These coordinate components are designated $X_t$, $Y_t$, and $Z_t$. At process step 402 the coordinates of the wrist centerpoint are computed as the difference between the coordinates of the tool centerpoint and the coordinate components of the tool vector. These coordinates of the wrist centerpoint are designated as $X_w$, $Y_w$, and $Z_w$ and define a matrix designated $\overline{S}_w$.

The Newton-Raphson solution technique requires the definition of error functions which have values of zero at the solution points. The solution technique involves the successive approximation of variable values to drive the error functions toward the desired zero values. The change of the solution values for each approximation are derived from the error functions. Therefore, at process step 404, as indicated by the matrix notation $\overline{F}(\overline{\Phi})$, the matrix of error functions $F_x$, $F_y$, and $F_z$ is evaluated for an initial approximation using the values of the machine axis joint angles from the previous iteration. Each error function is defined as the difference between the previously computed wrist centerpoint coordinate and the wrist centerpoint coordinate defining expression relating the lengths of machine members $L_1$ and $L_2$ and the machine axis joint angles A, B, and C. The set of these relationships also comprise a matrix designated by H which is evaluated as a function of the value of the matrix of machine axis joint angles A, B, and C designated by $\bar{\Phi}$.

At process step 408 values for the machine axis joint angles for the current path iteration are computed using the preceding path iteration values and a change of values derived from the error functions. For brevity, matrix notation is used and the change values are defined as the product of the inverse of the partial derivative of the error function with respect to a selected machine axis joint angle and the magnitude of the error function.

Execution continues at process step 414 where proximity iteration values are calculated for use by the velocity constraint subroutine. As has been previously stated, the wrist design illustrated in FIGS. 1 and 3b is subject to being driven to critical configurations from which continued motion may require gross changes of the axes of rotation instantaneously. Applicants have determined that critical configurations of this wrist will occur when the magnitude of the angle between imaginary vectors coincident with the first and third axes of wrist rotation is zero. Consequently, expressions relating the machine axis joint angles A, B, and C and the orientation angles D, E, and R may be used to determine iterative proximity to a critical configuration assuming constant velocity. Therefore, at process step 414 three iteration proximity values are computed: $K_{c1}$, $K_{c2}$, and $K_{c3}$ representing the number of iterations between the current configuration and a critical configuration. Each iteration proximity value represents the proximity of a single coordinate component of the vector dot product of the imaginery vectors to the critical configuration. In each expression associated with process step 414 the numerator represents the absolute angular distance between the current configuration and the critical configuration and the denominator represents the angular distance between the configuration of the previous iteration and the current configuration. The values produced at process step 414 are used by the velocity constraint subroutine in determining whether or not velocity constraint is required.

Following computation of the values of the inner three machine axis joint angles, and the iteration proximity values, execution of the transformation subroutine proceeds with the calculation of the values for rotation of the three wrist axes. The first of these values to be computed is for the second axis of rotation W2 corresponding to rotation of the outer segment 31 about the axis perpendicular to the slice between the outer segment 31 and the inner segment 33. The process for calculating the magnitude of the second angle of rotation W2 proceeds through an iterative approximation to produce an acceptable value for an error function defined following the Newton-Raphson technique. The error function is a relationship of the known angles A, B, and C and the orientation angles D and E and the angle of inclination of the axis of the second rotation W2 to the axis of the first rotation W1. This angle is designated as G.

Figure 7B:
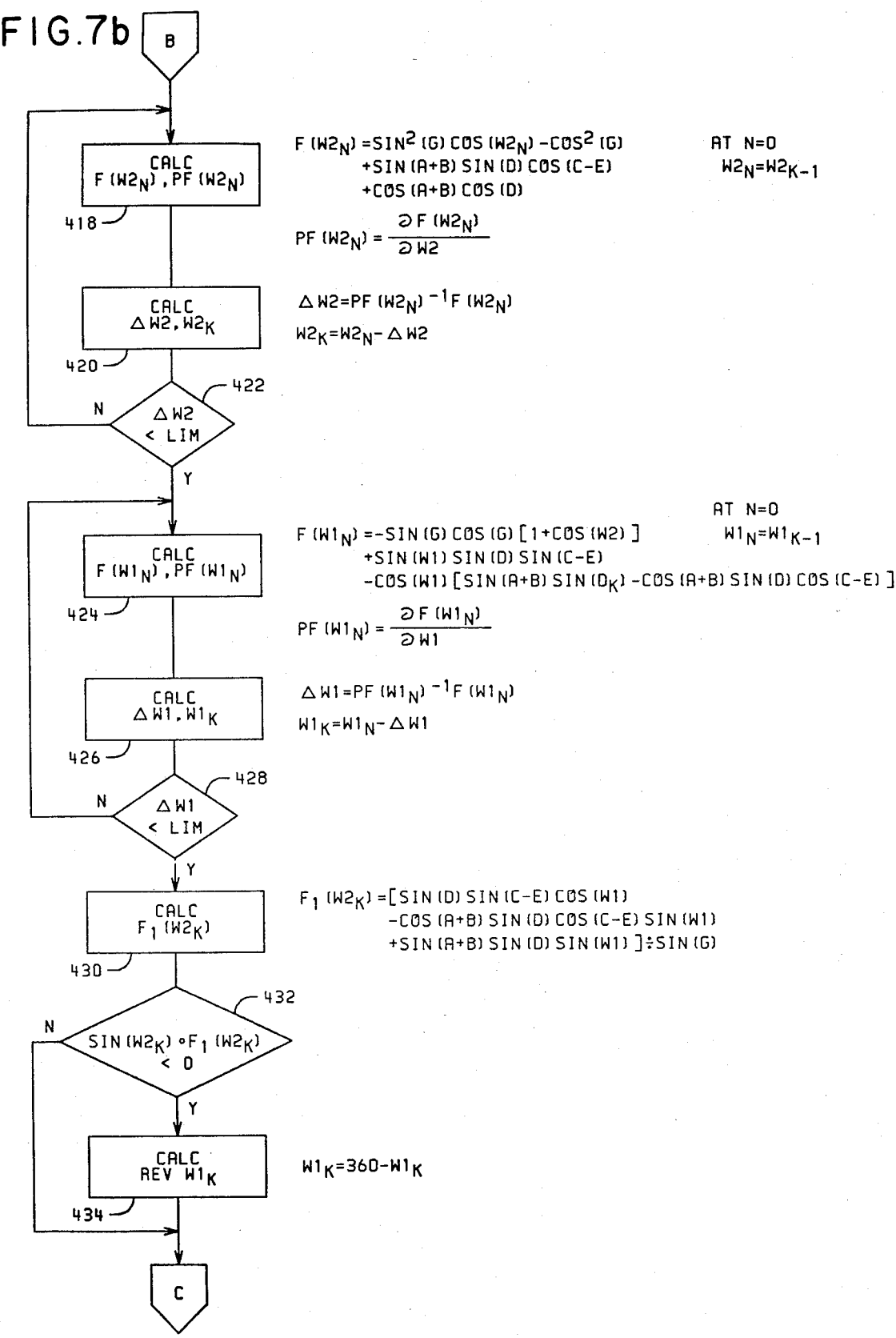

Referring now to FIG. 7b, at process step 418 an initial value for the error function is computed using the value of W2 effective for the preceding path iteration. In addition, the partial derivative of the error function is computed. At process step 420 the change in magnitude of W2 is computed and a new value of W2 defined as the difference between the value of W2 of the preceding approximation and the change in magnitude of W2 is computed. At decision step 422 the magnitude of the change of magnitude of W2 is compared against its limit to determine whether or not this difference value is within an acceptable tolerance. If it is not, process steps 418 through decision step 422 are repeated until an acceptable value for the change in W2 is produced by iterative approximation. The subscript variable N represents the approximation iteration count associated with the successive execution of steps 418 through 422. Once it is determined at decision step 422 that the change in W2 is within an acceptable tolerance, execution of the transformation routine continues with the calculation of a value for the first rotation W1.

The solution for the magnitude of the rotation W1 also follows the iterative approximation technique. Thus, at process step 424 the error function value using the previous iteration value of W1 is computed. In addition, the partial derivative of the error function used to calculate the magnitude of the change of the rotation W1 is computed. At process step 426 the change in magnitude of W1 and a new value for W1 are computed. At decision step 428 the magnitude of the change of W1 is tested against a limit to determine whether or not the change is within an acceptable tolerance. If it is not, then process steps 424 through decision step 428 are repeated until the magnitude of the change in W1 is acceptable. W1 is substituted in the equations setforth to the right of the flow The subscript N represents the iteration count associated with the repetition of steps 424 through 428.

The calculation of the magnitude of the final axis of rotation W3 follows the Newton-Raphson technique with the exception that duplicate error functions and partial derivative values are computed, a selection being made between the computed values thereof to produce the value of the change of magnitude of W3 and the new value of W3. Referring to FIG. 7c at process step 436 values of a first error function $F_1(W3)$ and a partial derivative thereof are computed using as an initial approximation the previous path iteration value of W3. At process step 438 values of a second function $F_2(W3)$ and partial derivative thereof are computed again using as an initial approximation the previous path iteration value of W3. At decision step 440 the partial derivative of the first function $F_1(W3)$ is compared to the partial derivative of the second function $F_2(W3)$ and if larger the change of magnitude of W3 and a new value of W3 are computed at process step 444 using the first error function. Alternative error functions are produced to insure the availability of a nonzero value of the partial derivatives in the evaluation of the change of angle W3. If at decision step 440 it had been determined that the first error function partial derivative were not larger than the partial derivative of the second error function then the calculation of the change of W3 and the new value of W3 would take place at process step 442 using the second error function. In either event, execution proceeds to decision step 446 where it is determined whether or not the change in W3 is within an acceptable tolerance. Again, if the change in W3 is not less than a predetermined limit then the steps 436 through 446 would be repeated until an acceptable value for the change of W3 is produced as determined by decision step 446. As before, the subscript notation N represents the approximation iteration count associated with the successive execution of steps 436 through 444.

Having defined new iteration values for all joint angles and the magnitudes of the rotations of the wrist W1, W2, and W3, corresponding motor drive values are computed at process step 448 using gear ratios relating the magnitudes of the angles to magnitudes of drive commands for the machine axis drive motors. Upon completion of the calculation of process step 448, the execution of the coordinate transformation subroutine is complete and execution of the overall coordinate transformation routine resumes by the return through terminal 450. Execution of the flow chart of FIG. 6c proceeds then at process step 226 where the change in the drive axis command is computed to produce the machine axis command signals. At process step 228 the machine axis command signals are stored in a buffer for access by the servo mechanism upon occurance of the servo interrupt signal.

Figure 8:
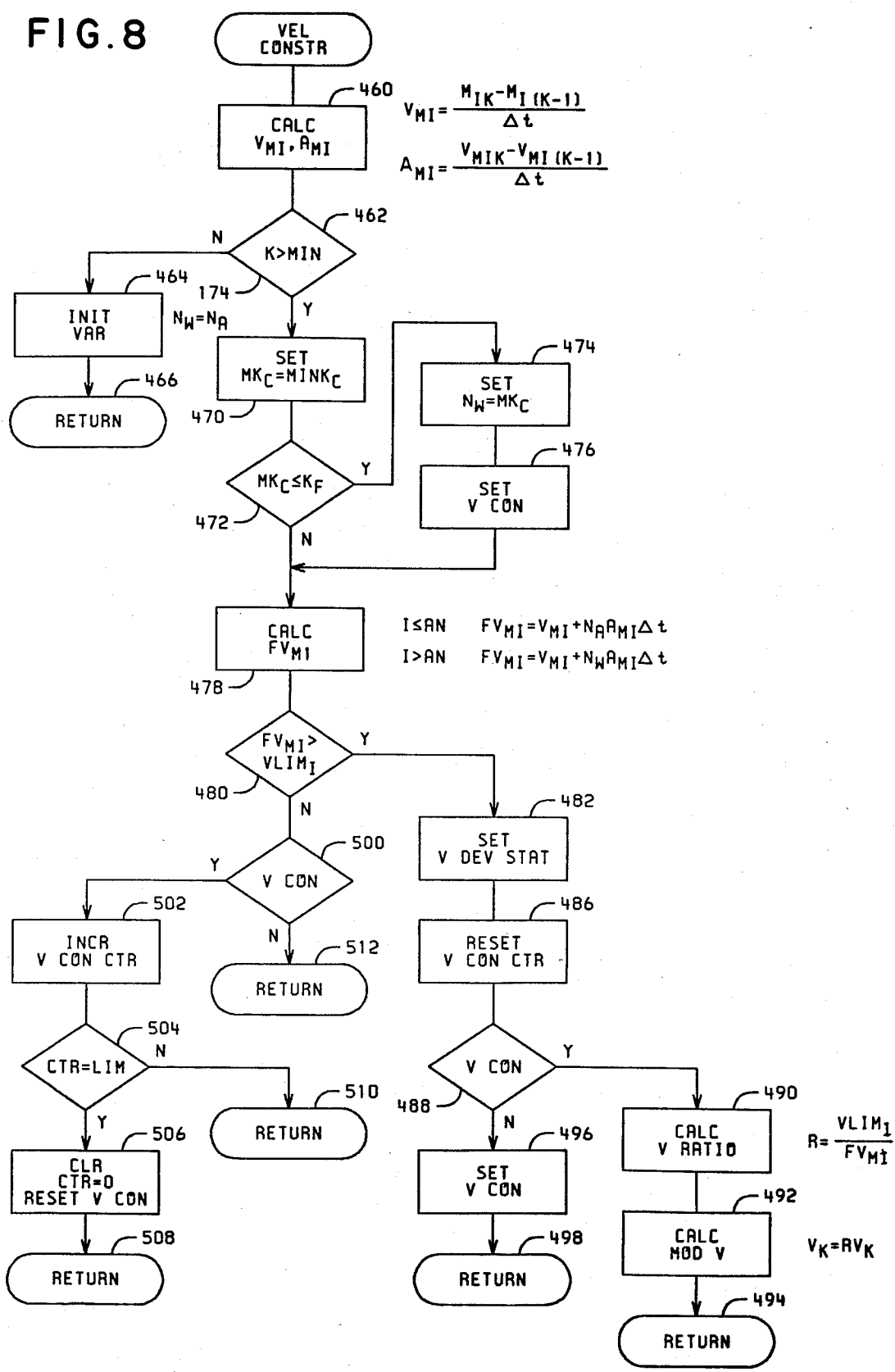
FIG. 8 is a flow chart of the procedure for modifying the incremental velocity value according to the excess velocity performance.
Figure 7A:
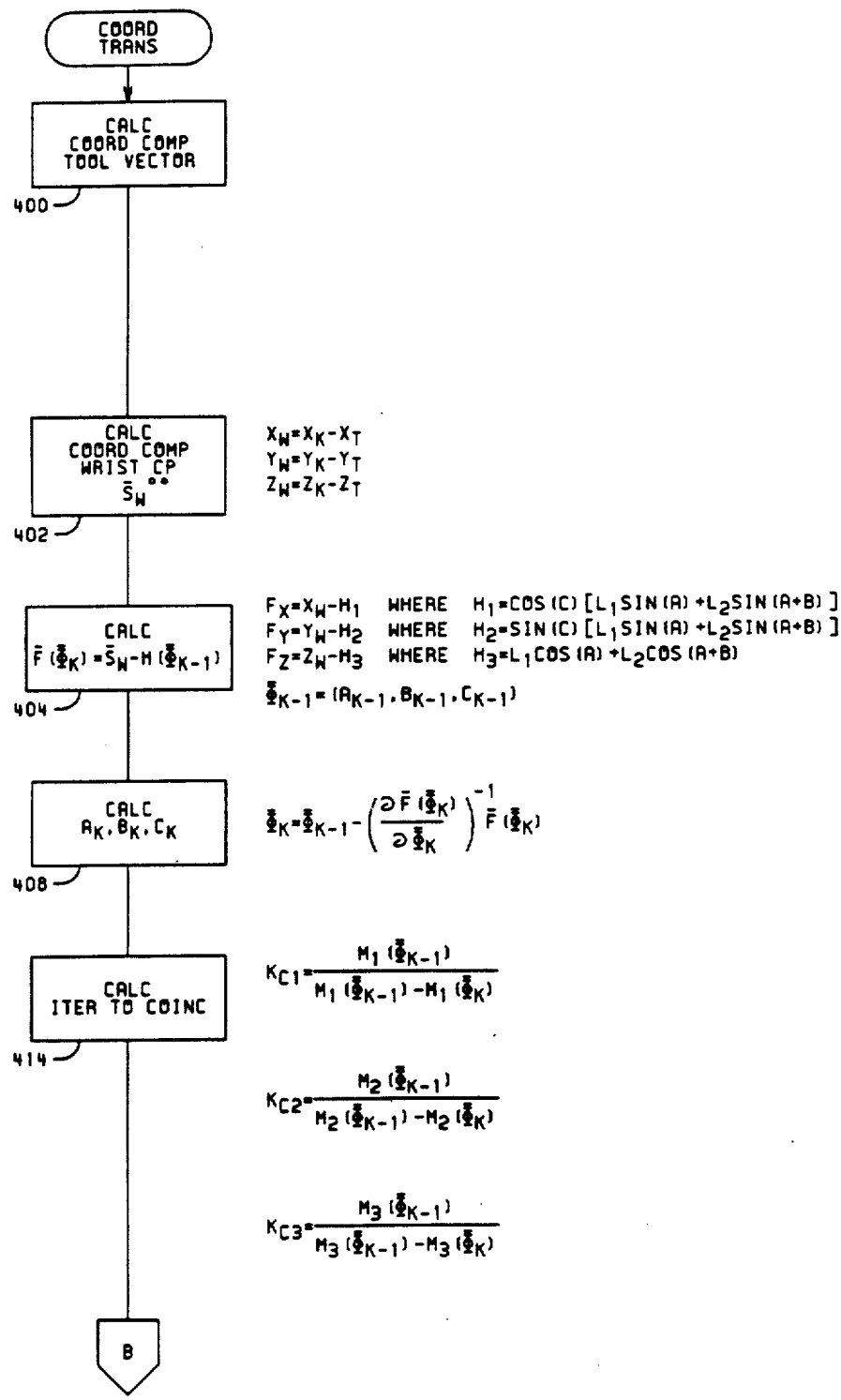
Figure 7C:
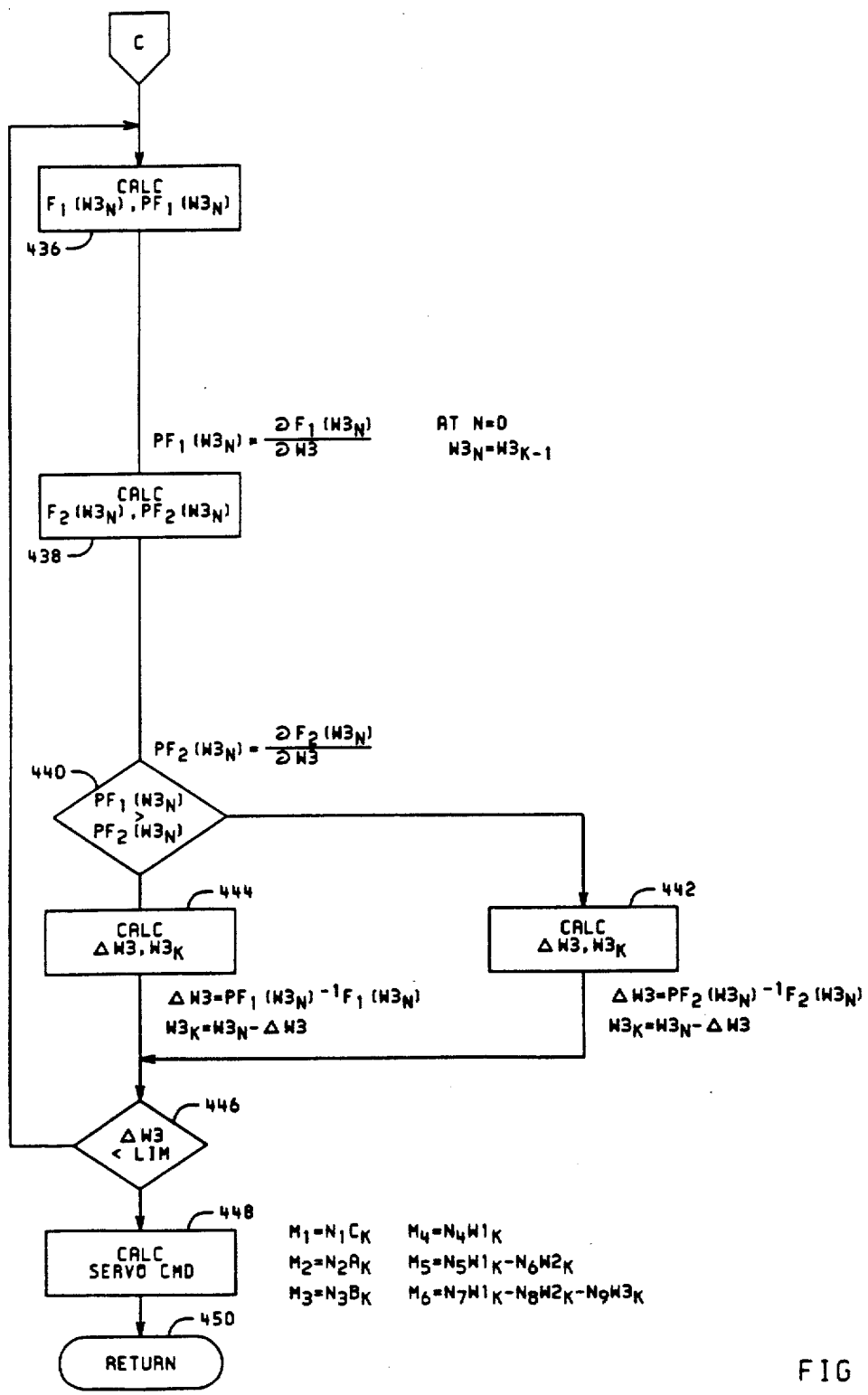

With the machine axis commands defined for the present iteration, a determination may be made whether or not the velocity and change in velocity reflected in these command signals requires constraint of the path velocity to prevent the commanded machine axis velocity for any of the six machine axes from exceeding its associated limit. Determination of whether or not a constraint is required is accomplished by execution of the velocity constraint subroutine illustrated by the flow chart of FIG. 8.

At process step 460 velocity and acceleration reflected by the current iteration values of the machine axis command signals are computed. The velocity is defined as the change in magnitude of the command signal from the preceding iteration divided by the iteration interval period $\Delta t$. Acceleration is defined as the change in velocity between the current and previous iteration divided by the iteration interval period. The index I is used to identify the axis for which the velocity and acceleration values are computed. At decision step 462 it is determined whether or not the current iteration occurs so early in the interpolation of the current span that velocity constraint is inappropriate. The value of the current iteration counter K is compared to a minimum value and if not greater than the minimum value then variables used by the velocity constraint subroutine are initialized at process step 464. Thereafter, the execution of the overall control procedure is resumed by the return through terminal 466.

Once the current iteration is one occurring subsequent to the minimum number of iterations, execution beyond decision step 462 would continue at process step 470 where the variable $MK_c$ is set equal to the minimum of the iteration proximity values calculated at process step 414 of FIG. 7a. That is, $MK_c$ is made equal to the lesser of the positive values of $K_{c1}$, $K_{c2}$, and $K_{c3}$. At decision step 472 the value of $MK_c$ is compared to a limit value defining proximity to a critical configuration. If the minimum value is less than or equal to the limit $K_f$ the wrist acceleration iteration multiplier $N_w$ is set equal to this number of proximity iterations at process step 474. At process step 476 the velocity constraint status flag is set. If it had been determined at decision step 472 that the minimum value of proximity iterations were greater than the limit value, process steps 474 and 476 would be skipped. In either event, the calculation of the projected velocities for each machine axis is performed at process step 478. Two different calculations are used depending on which axis is being considered. The index I identifies the axis and values thereof above the axis number AN associated with wrist axes effect selection of the calculation used for the wrist axes. For the inner three joint angles, the projected velocity signal FV is equal to the sum of the computed velocity from process step 460 and a velocity increment equaling the product of the calculated acceleration value, the iteration interval period, and an iteration multiplier $N_a$ for acceleration. The projected velocity signal for the wrist axes is computed as the sum of the calculated velocity and the product of the calculated acceleration value, the iteration interval period, and the iteration multiplier $N_w$ which is either equal to $N_a$ or is the minimum value determined at process step 470.

At decision step 480 it is determined whether any of the projected velocity signals exceed the associated limits representing limit values of the machine axes velocities. If so, execution of the velocity constraint subroutine continues at process step 482 where the velocity deviation status flag is set. At process step 486 the velocity constraint counter used to monitor the number of iterations since the onset of velocity constraint is reset. At decision step 488 it is determined whether or not the velocity constraint status flag has been set. If it has, a velocity ratio is calculated at process step 490 by dividing the limit value by the associated projected velocity value of an axis exceeding the limit. While more than one projected axis velocity could exceed its limit, a ratio is computed only for the axis first identified by the comparison of step 480. At process step 492 a modified incremental velocity is computed as a product of the velocity ratio calculated at step 490 and the previously computed value for the incremental velocity $V_k$. Having produced a modified incremental velocity, execution of the velocity constraint subroutine is complete and execution of the overall control procedure is resumed by the return through terminal 494.

If it had been determined at decision step 488 that the velocity constraint status flag had not been set then it would be set at process step 496 to indicate an initial occurrence of an excess velocity. Thereafter, execution of the overall control procedure would be resumed by the return through terminal 498.

Except in the case of excess projected velocities associated with the wrist axes, iterations producing excessive projected velocities must occur within a series of a predefined number of iterations following an iteration in which an excess projected velocity is calculated in order to invoke velocity reduction. For each successive iteration following the production of an excessive projected velocity in which there is no excessive projected velocity, a counter is incremented to reflect the relative velocity stability of the most recent machine performance.

Considering this conditional constraint, if it had been determined at decision step 480 that no projected velocity signal exceeded its associated limit, execution would continue at decision step 500 to determine whether or not the velocity constraint status flag had previously been set. If not, execution of the velocity constraint subroutine would be completed and execution of the overall control procedure would resume by the return at terminal 512. If on the other hand, the velocity constraint status flag had previously been set as determined by decision step 500, execution would proceed at process step 502 where the velocity constraint counter would be incremented. Thereafter, at decision step 504 the counter contents are compared against the limit defining the number of successive iterations for which no excessive projected velocity is produced consistent with stable velocity performance. If the counter magnitude is not equal to the limit value, the execution of the velocity constraint subroutine is complete and execution of the overall control procedure resumes by the return through terminal 510. When the counter contents are found to be equal to the limit value, the counter is reset to zero and the velocity constraint status flag is reset at process step 506. Thereafter, execution of the overall control procedure continues through the return of terminal 508.

Considering the alternative paths from decision step 480 it is now apparent that for each iteration in which a projected velocity exceeds its associated limit, the resetting of the velocity constraint counter at process step 486 restarts the measurement of successive acceptable iterations. It will be noted that the use of two different iteration multipliers in the acceleration term of the calculation for projected velocities provides a means for special treatment of the acceleration performance associated with the wrist axes. Applicants have determined that within proximity of the critical configurations previously described, a longer range projection based on the acceleration provides adequate protection against excessive velocities for the wrist drives without producing an unacceptably high level of false indications of excessive velocities.

The velocity constraint algorithm overcomes the deficiencies of velocity constraint systems which rely upon an immediate response to actual performance at or near a limit by producing projected velocity signals to anticipate potential occurrences of excessive velocities. Further, the reduction of path velocity produced by process steps 490 and 492 is equal in magnitude to the largest excessive velocity produced by the projected velocity signals. It will be appreciated that while the tool centerpoint may be undergoing constant velocity motion, various machine axes may be undergoing effective acceleration or deceleration as a result of the changing magnitudes of their rotations dictated by the constant increment interval. Consequently, the velocity constraint subroutine is executed for each iteration irrespective of whether or not the tool centerpoint is undergoing acceleration, constant velocity, or deceleration. Further, by virtue of the incorporation of the velocity constraint subroutine within the interpolation processes heretofore described, it is not necessary for the programmer to select a path control type in advance of automatic operation. Rather, the velocity constraint subroutine permits normal path control so long as the axis velocities are acceptable but dynamically modifies path velocity to constrain axis velocities to their limit values. In this manner, no additional programming is required and the impact of velocity constraint is minimized by limiting the period of velocity constraint to the period of undesired axis velocity performance.

While the present invention has been described with reference to the preferred embodiment, and while the preferred embodiment has been described in considerable detail, it is not the intention of applicants to limit in any way the scope of the appended claims to such detail. Rather, it is the intention of applicants, that the invention be accorded the full scope of all equivalents, modifications and alterations to the definition found in the appended claims.

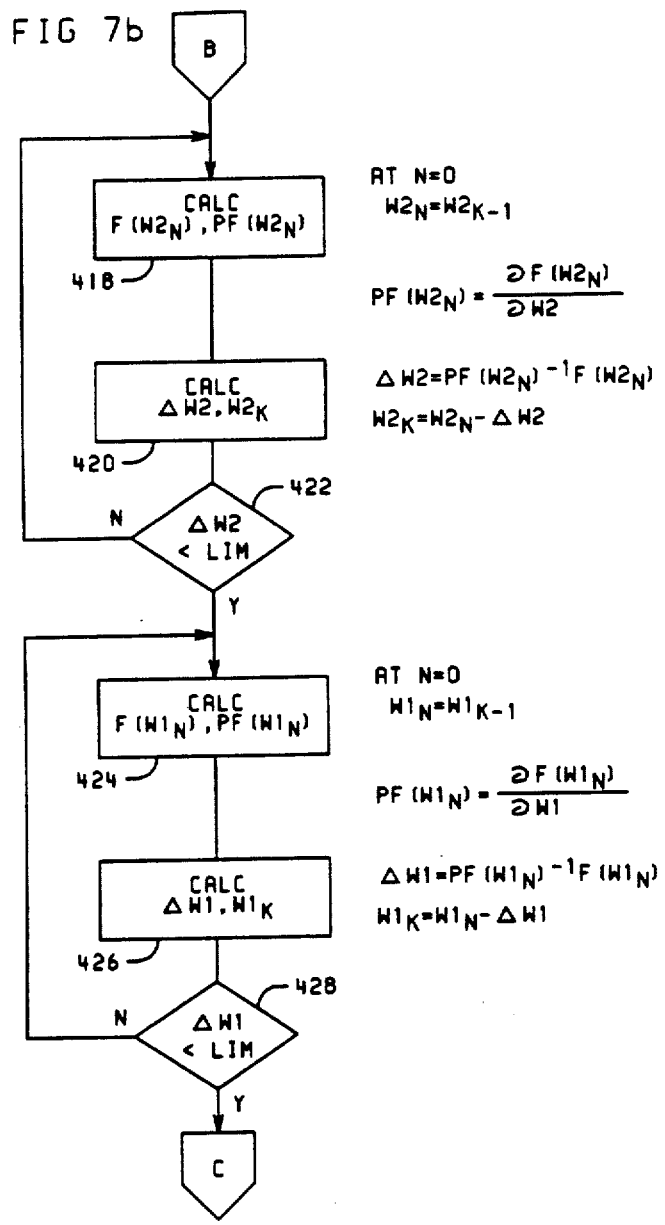

What is claimed is:

1. A method for controlling motion of a function element carried by a machine having a plurality of movable members including at least one member pivoting about an axis of rotation and actuators for effecting motion of the members, the motion of the fuction element being described by a continuous path of a point associated with the function element between two locations and being produced in response to input signals representing coordinate values relative to a rectangular coordinate system of the locations and further input signals repersenting a path velocity of said point between said locations, the method comprising the steps of:
    (a) producing an increment velocity signal in response to the input signals, the increment velocity signal representing the velocity of the point along the path during a time interval of predetermined duration;
    (b) producing a set of machine axes command signals in response to the increment velocity signal, the machine axes command signals representing increments of motion of machine members relative to their respective axes of motion during the time interval;
    (c) producing projected velocity signals in response to the machine axes command signals, the projected velocity signals representing velocities of the machine members relative to their respective axes in a time interval subsequent to the interval during which the projected velocity signals are produced;
    (d) comparing the projected velocity signals to limit signals, each limit signal representing a limit value of velocity of a machine axis;
    (e) iterating steps (a) through (d) to effect a series of increment motions of the point along the path between the locations; and
    (f) reducing the increment velocity signal for an iteration subsequent to an iteration in which a projected velocity signal is detected to exceed a limit signal.

2. The method of claim 1 wherein during motion of the function element the machine members may attain a critical configuration requiring instantaneous changes of a machine member position to maintain the point on the continuous path and the step of producing projected velocity signals further comprises the steps of:
    (a) producing velocity signals in response to the machine axes command signals, the velocity signals representing velocities of machine members relative to their respective axes;
    (b) producing acceleration signals in response to the velocity signals, the acceleration signals representing accelerations of machine members relative to their respective axes;
    (c) producing a proximity iteration signal representing a number of iterations between a machine member configuration occurring in an iteration and a critical configuration;
    (d) producing a first iteration multiplier signal defining a predetermined subsequent iteration for which a projected velocity signal representing a projected velocity of an axis not subject to a critical configuration is being produced;
    (e) producing a second iteration multiplier signal in response to the proximity iteration signal defining a subsequent iteration for which the critical configuration will occur; and (f) summing the velocity signals and products of the acceleration signals and selectively, the first and second iteration multiplier signals to produce the projected velocity signals.

3. The method of claim 1 wherein the step of reducing the increment velocity signal further comprises the steps of:
   (a) counting iterations following an iteration in which a projected velocity signal is detected to exceed a limit signal;
   (b) producing a reduced velocity signal in each iteration occurring within a predetermined number of iterations of the iteration in which an axis velocity signal is detected to exceed a limit signal; and
   (c) inhibiting an increase in the increment velocity signal in any iteration occurring within a predetermined number of iterations of the iteration in which a projected velocity signal is detected to exceed a limit signal.

4. An apparatus for controlling motion of a function element carried by a machine having a plurality of movable members including at least one member pivoting about an axis of rotation and actuators for effecting motion of the members, the motion being described by a continuous path of a point associated with the function element between two locations and being produced in response to input signals representing the coordinate values of the locations relative to a program coordinate system and further inputs signals representing a path velocity of said point between said locations, the apparatus comprising:
   (a) means for iteratively producing increment velocity signals in response to the input signals, each increment velocity signal representing the velocity of the point along the path during an iteration interval;
   (b) means for producing machine axes command signals in response to the increment velocity signals, the machine axis command signals representing increments of motion of machine members relative to their respective axes of motion for each iteration;
   (c) means for producing projected velocity signals in response to the machine axes command signals, the projected velocity signals representing velocities of machine members relative to their respective axes which will occur in an iteration subsequent to an iteration in which the projected velocity signals are produced;
   (d) means for comparing the projected velocity signals to limit signals, each limit signal representing a limit velocity value of a machine axis; and
   (e) means for reducing the increment velocity signal for an iteration succeeding an iteration in which a projected velocity signal is detected to exceed a limit signal.

5. The apparatus of claim 4 wherein the means for producing projected velocity signals further comprises:
   (a) means for producing a velocity signal representing a change of machine member position relative to its respective axis occurring between successive iterations;
   (b) means for producing an acceleration signal representing a change of machine member velocity relative to its respective axis between successive iterations; and
   (c) means for summing the velocity signal and a product of the acceleration signal and an iteration multiplier signal defining a subsequent iteration in which a machine member velocity represented by the projected velocity signal will occur.

6. The apparatus of claim 5 wherein during motion of the function element the machine may attain a critical configuration requiring an instantaneous change of position of a member to maintain the point on the continuous path and the apparatus further comprises means for producing a proximity iteration signal representing a number of iterations between a machine member configuration occurring in an iteration and a critical configuration.

7. The apparatus of claim 6 wherein the means for producing projected velocity signals further comprises means for selecting a first iteration multiplier for axes not subject to critical configurations and a second iteration multiplier for axes subject to a critical configuration.

8. The apparatus of claim 7 wherein the means for selecting a second iteration multiplier further comprises:
   (a) means for comparing the proximity iteration signal to a proximity defining limit signal;
   (b) means for setting the second iteration multiplier signal equal to the proximity iteration signal when the proximity iteration signal is less than the proximity defining limit signal; and
   (c) means for setting the second iteration multiplier signal equal to the first iteration multiplier signal when the proximity iteration signal is greater than the proximity defining limit signal.

9. The apparatus of claim 8 wherein the machine includes a plurality of rotating members and associated obiquely intersecting axes of rotation for controlling orientation of the function element.

10. The apparatus of claim 5 wherein the means for reducing the increment velocity signal further comprises:
    (a) means for producing a velocity ratio signal in response to detecting a projected velocity signal in excess of a limit signal, the velocity ratio signal representing the ratio of the limit velocity value to the machine member velocity represented by the projected velocity signal of an axis having a projected velocity signal in excess of a limit signal; and
    (b) means for producing a modified velocity signal in response to the velocity ratio signal, the modified velocity signal representing the product of the increment velocity signal and the velocity ratio signal.

11. The apparatus of claim 10 further comprising:
    (a) means for counting iterations in response to detecting a projected velocity signal in excess of a limit signal;
    (b) means responsive to the comparing means for resetting the iteration counting means in an iteration when a projected velocity signal exceeds a limit signal; and
    (c) means responsive to the comparing means for incrementing the counting means in an iteration when no projected velocity signal exceeds an associated limit signal.

12. The apparatus of claim 11 further comprising means responsive to the iteration counting means for inhibiting an increase in the increment velocity signal in an iteration occuring prior to the counting means having been incremented to a predetermined number of iterations.

* * * * *

UNITED STATES PATENT AND TRADEMARK OFFICE
CERTIFICATE OF CORRECTION

PATENT NO. : 4,623,971

DATED : November 18, 1986

INVENTOR(S) : LaVerne K. Ailman et al.

Figure 7C:
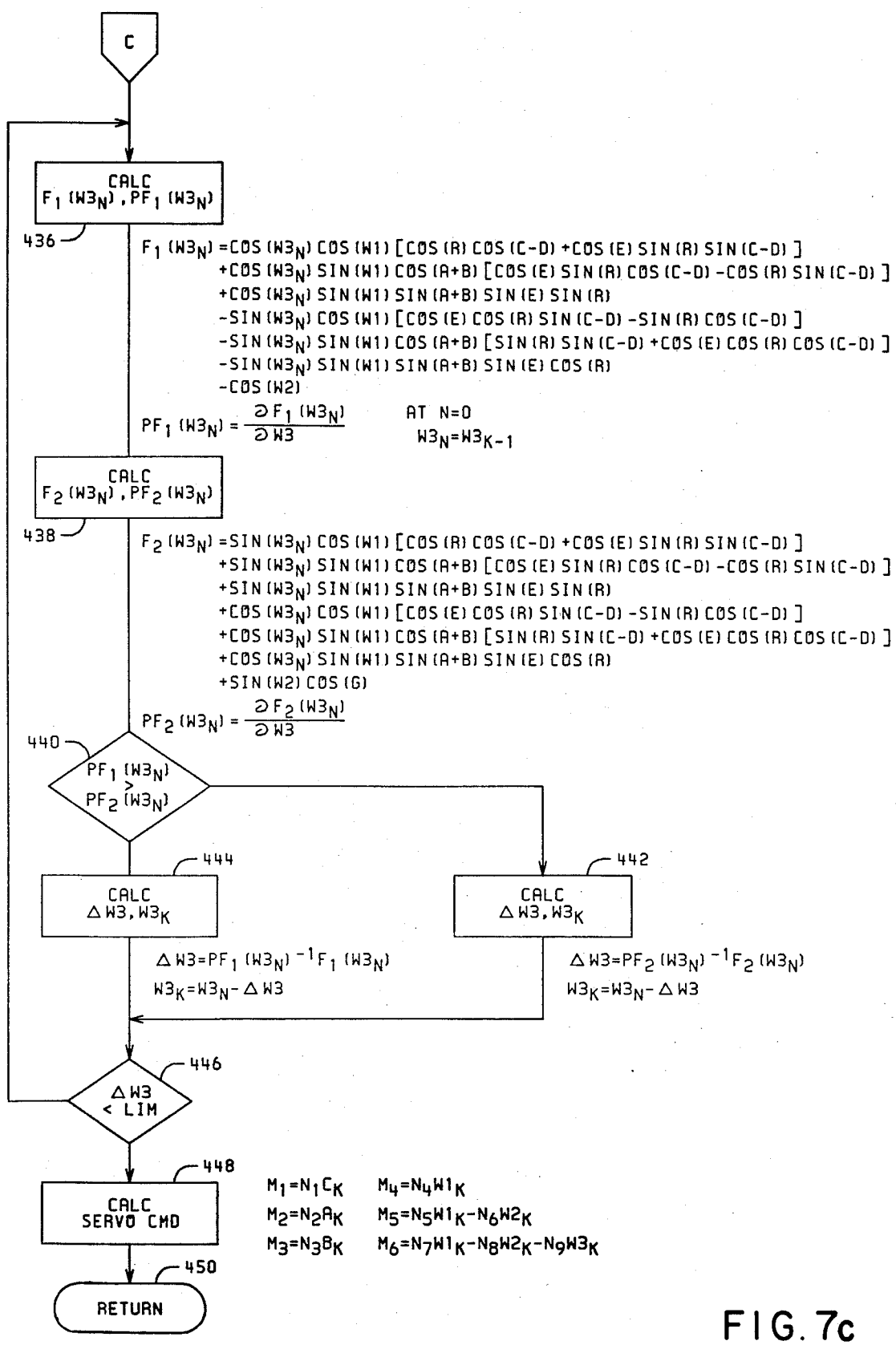

It is certified that error appears in the above-identified patent and that said Letters Patent is hereby corrected as shown below:

In the drawings Figures 7a, 7b and 7c should be deleted to appear as per attached sheets.

Column 15, line 37, before "In" should read --Each interation proximity value represents the proximity of a single coordinate component of the vector dot product of the imaginery vectors to the critical configuration. --

Column 16, lines 31 to 34, the sentence beginning after "acceptable" should be deleted.

Signed and Sealed this

Twenty-first Day of April, 1987

*Attest:*

DONALD J. QUIGG

*Attesting Officer*  *Commissioner of Patents and Trademarks*